(12) United States Patent
Kobayashi et al.

(10) Patent No.: US 7,986,593 B2
(45) Date of Patent: Jul. 26, 2011

(54) OPTICAL INTEGRATED DEVICE, METHOD FOR DETECTING LIGHT, OPTICAL PICKUP, AND OPTICAL DISC APPARATUS

(75) Inventors: Takashi Kobayashi, Kanagawa (JP); Katsuhiro Seo, Kanagawa (JP); Midori Kanaya, Tokyo (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 12/638,124

(22) Filed: Dec. 15, 2009

(65) Prior Publication Data

US 2010/0149956 A1    Jun. 17, 2010

(30) Foreign Application Priority Data

Dec. 16, 2008 (JP) .................... 2008-319902

(51) Int. Cl.
*G11B 7/00* (2006.01)
(52) U.S. Cl. ............. 369/44.12; 369/44.37; 369/112.27; 369/112.28; 369/112.14
(58) Field of Classification Search .................. None
See application file for complete search history.

(56) References Cited

U.S. PATENT DOCUMENTS

| 6,934,228 B2 * | 8/2005 | Shimano et al. ............ 369/44.35 |
| 7,283,439 B2 * | 10/2007 | Shimano et al. ............ 369/44.37 |

FOREIGN PATENT DOCUMENTS

JP    2007-265595    10/2007

* cited by examiner

*Primary Examiner* — Muhammad N Edun
(74) *Attorney, Agent, or Firm* — Wolf, Greenfield & Sacks, P.C.

(57) ABSTRACT

An optical integrated device includes a light source; a light splitting-and-guiding section that splits a reflected light beam into two end light beams, a connection light beam, and a residual light beam, and guides the two end light beams and the connection light beam in directions different from a direction of the residual light beam; and a light receiving section that receives the two end light beams and the connection light beam with photodetection devices divided, in the tangential direction, into at least two regions within a range in which the connection light beam is incident, receives the residual light beam with photodetection devices divided, in the tangential direction, into regions having widths corresponding to portions on which the two end light beams are incident, and outputs a detection signal in accordance with an amount of light received with each of the photodetection devices.

9 Claims, 23 Drawing Sheets

OPTICAL INTEGRATED DEVICE, METHOD FOR DETECTING LIGHT, OPTICAL PICKUP, AND OPTICAL DISC APPARATUS

BACKGROUND OF THE INVENTION

1. Field of the Invention

The present invention relates to an optical integrated device, a method for detecting light, an optical pickup, and an optical disc apparatus. In particular, the present invention relates to an optical disc apparatus that records information on an optical disc and reproduces information from the optical disc.

2. Description of the Related Art

Optical disc apparatuses widely used today emit light beams from laser diodes of optical pickups, irradiate optical disks with the light beams through objective lenses, and read reflected light of the light beams so as to reproduce information.

Moreover, optical disc apparatuses can record information on optical discs by irradiating the optical discs with light beams and changing the local reflectivity of the optical discs.

In general, an optical disc apparatus focuses a light beam on a desired target position of an optical disc by performing servo control of an objective lens.

In practice, an optical disc apparatus generates a focus error signal and a tracking error signal in accordance with reflected light that has been received. The focus error signal indicates the amount of deviation of a focal point of a light beam from a target position in a focusing direction. The tracking error signal indicates the amount of deviation in a tracking direction. The focusing direction refers to a direction toward or away from the surface of an optical disc. The tracking direction refers to the radial direction of the optical disc.

The optical disc apparatus performs the servo control of the objective lens using the focus error signal and the tracking error signal. Therefore, the qualities of the focus error signal and the tracking error signal determine the accuracy of the servo control in the optical disc apparatus.

In particular, in an optical disc apparatus, when an objective lens moves in the tracking direction due to servo control in the tracking direction (when so-called "lens shift" occurs), a position at which reflected light is received is shifted and thereby the qualities of the error signals are reduced.

To address this problem, Japanese Unexamined Patent Application Publication No. 2007-265595, for example, discloses an optical disc apparatus that detects the amount of lens shift by intentionally blocking or splitting a portion of reflected light and receiving the reflected light with a plurality of light receiving regions, and adjusts error signals using the detection results so as to increase the quality of the error signals (see FIG. 5 of the Publication).

SUMMARY OF THE INVENTION

The above-described optical disc apparatus splits a portion of reflected light using a diffraction grating.

However, in an optical disc apparatus, the mounting position of a diffraction grating may deviate from an appropriate position due to an assembling error or other reasons.

Such an optical disc apparatus may not accurately detect the amount of lens shift because reflected light is incident on the diffraction grating at a deviated position. As a result, a problem arises in that the quality of error signals of the optical disc apparatus is reduced, whereby the accuracy of servo control is reduced.

Therefore, it is desirable to provide an optical integrated device, a method for detecting light, and an optical pickup, each of which generates detection signals for high-precision servo control, and to provide an optical disc apparatus that performs high-precision servo control.

An optical integrated device according to an embodiment of the present invention includes a light source that emits a light beam; a light splitting-and-guiding section that splits a reflected light beam into two end light beams, a connection light beam, and a residual light beam, and guides the two end light beams and the connection light beam in directions different from a direction of the residual light beam, the reflected light beam being a portion of the light beam reflected from an optical disc including a track extending in a tangential direction, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and a light receiving section that receives the two end light beams and the connection light beam with a plurality of photodetection devices divided, in the tangential direction, into at least two regions within a range in which the connection light beam is incident, receives the residual light beam with a plurality of photodetection devices divided, in the tangential direction, into a plurality of regions having widths at least corresponding to portions on which the two end light beams are incident, and outputs a detection signal in accordance with an amount of light received with each of the photodetection devices.

The optical integrated device can make a predetermined signal processor correct a signal component of the intensity of the residual light beam, which is detected with the photodetection devices corresponding to the end light beams, using the intensity of the connection light beam, which is detected with the photodetection device the same as those for detecting the end light beams, even if the optical axis of the reflected light beam is deviated in the tangential direction. As a result, the optical integrated device can increase the precision of the amount of lens shift that is calculated on the basis of the detection result of the two end light beams, and increase the precision of calculation of error signals.

A method for detecting light according to an embodiment of the present invention includes the steps of emitting a light beam from a predetermined light source; splitting a reflected light beam into two end light beams, a connection light beam, and a residual light beam, and guiding the two end light beams and the connection light beam in directions different from a direction of the residual light beam, the reflected light beam being a portion of the light beam reflected from an optical disc including a track extending in a tangential direction, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and receiving the two end light beams and the connection light beam with a plurality of photodetection devices divided, in the tangential direction, into at least two regions within a range in which the connection light beam is incident, receiving the residual light beam with a plurality of photodetection devices divided, in the tangential direction, into a plurality of regions having widths at least corresponding to portions on which the two end light beams are incident, and outputting a detection signal in accordance with an amount of light received with each of the photodetection devices.

The method for detecting light can make a predetermined signal processor correct a signal component of the intensity of the residual light beam, which is detected with the photodetection devices corresponding to the end light beams, using the intensity of the connection light beam, which is detected with the photodetection devices the same as those for detecting the end light beams, even if the optical axis of the reflected light beam is deviated in the tangential direction. As a result, the method for detecting light can increase the precision of the amount of lens shift that is calculated on the basis of the detection result of the two end light beams, and increase the precision of calculation of error signals.

An optical pickup according to an embodiment of the present invention includes a light source that emits a light beam; an objective lens that focuses the light beam on an optical disc including a track extending in a tangential direction; a light splitting-and-guiding section that splits a reflected light beam into two end light beams, a connection light beam, and a residual light beam, and guides the two end light beams and the connection light beam in directions different from a direction of the residual light beam, the reflected light beam being a portion of the light beam reflected from the optical disc, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and a light receiving section that receives the two end light beams and the connection light beam with a plurality of photodetection devices divided, in the tangential direction, into at least two regions within a range in which the connection light beam is incident, receives the residual light beam with a plurality of photodetection devices divided, in the tangential direction, into a plurality of regions having widths at least corresponding to portions on which the two end light beams are incident, and outputs a detection signal in accordance with an amount of light received with each of the photodetection devices.

The optical pickup can make a predetermined signal processor correct a signal component of the intensity of the residual light beam, which is detected with the photodetection devices corresponding to the end light beams, using the intensity of the connection light beam, which is detected with the photodetection devices the same as those for detecting the end light beams, even if the optical axis of the reflected light beam is deviated in the tangential direction. As a result, the optical pickup can increase the precision of the amount of lens shift that is calculated on the basis of the detection result of the two end light beams, and increase the precision of calculation of error signals.

An optical disc apparatus according to an embodiment of the present invention includes a light source that emits a light beam; an objective lens that focuses the light beam on an optical disc including a track extending in a tangential direction; a light splitting-and-guiding section that splits a reflected light beam into two end light beams, a connection light beam, and a residual light beam, and guides the two end light beams and the connection light beam in directions different from a direction of the residual light beam, the reflected light beam being a portion of the light beam reflected from the optical disc, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; a light receiving section that receives the two end light beams and the connection light beam with a plurality of photodetection devices divided, in the tangential direction, into at least two regions within a range in which the connection light beam is incident, receives the residual light beam with a plurality of photodetection devices divided, in the tangential direction, into a plurality of regions having widths at least corresponding to portions on which the two end light beams are incident, and outputs a detection signal in accordance with an amount of light received with each of the photodetection devices; a signal processor that generates, on the basis of the detection signal, an error signal that represents an amount of deviation of a focus of the light beam from a target position at which the light beam is to be focused; and a driving section that controls driving of the objective lens on the basis of the error signal.

The signal processor of the optical disc apparatus can correct a signal component of the intensity of the residual light beam, which is detected with the photodetection devices corresponding to the end light beams, using the intensity of the connection light beam, which is detected with the photodetection devices the same as those for detecting the end light beams, even if the optical axis of the reflected light beam is deviated in the tangential direction. As a result, the optical disc apparatus can increase the precision of the amount of lens shift that is calculated on the basis of the detection result of the two end light beams, and increase the precision of calculation of error signals.

The embodiments according to the present invention can make a predetermined signal processor correct a signal component of the intensity of the residual light beam, which is detected with the photodetection devices corresponding to the end light beams, using the intensity of the connection light beam, which is detected with the photodetection devices the same as those for detecting the end light beams, even if the optical axis of the reflected light beam is deviated in the tangential direction. As a result, the embodiments according to the present invention can increase the precision of the amount of lens shift that is calculated on the basis of the detection result of the two end light beams, and increase the precision of calculation of error signals. Thus, an optical integrated device, a method for detecting light, and an optical pickup, each of which generates detection signals for high-precision servo control, is provided.

The signal processor of the embodiment of the present invention can correct a signal component of the intensity of the residual light beam, which is detected with photodetection devices corresponding to the end light beams, using the intensity of the connection light beam, which is detected with the photodetection devices the same as those for detecting the end light beams, even if the optical axis of the reflected light beam is deviated in the tangential direction. As a result, the optical disc apparatus can increase the precision of the amount of lens shift that is calculated on the basis of the detection result of the two end light beams, and increase the precision of calculation of error signals. Thus, the embodiment of the present invention provides an optical disc apparatus that performs high-precision servo control.

DESCRIPTION OF THE PREFERRED EMBODIMENTS

Hereinafter, preferred embodiments (referred to as "embodiments") of the invention are described with reference to the drawings. The embodiments are described in the following order:

1. First Embodiment (an optical disc apparatus using an optical integrated device),
2. Second Embodiment (an optical disc apparatus using a combination of optical elements), and
3. Other Embodiments.

1. First Embodiment 1-1. Structure of Optical Disc Apparatus

Figure 1:
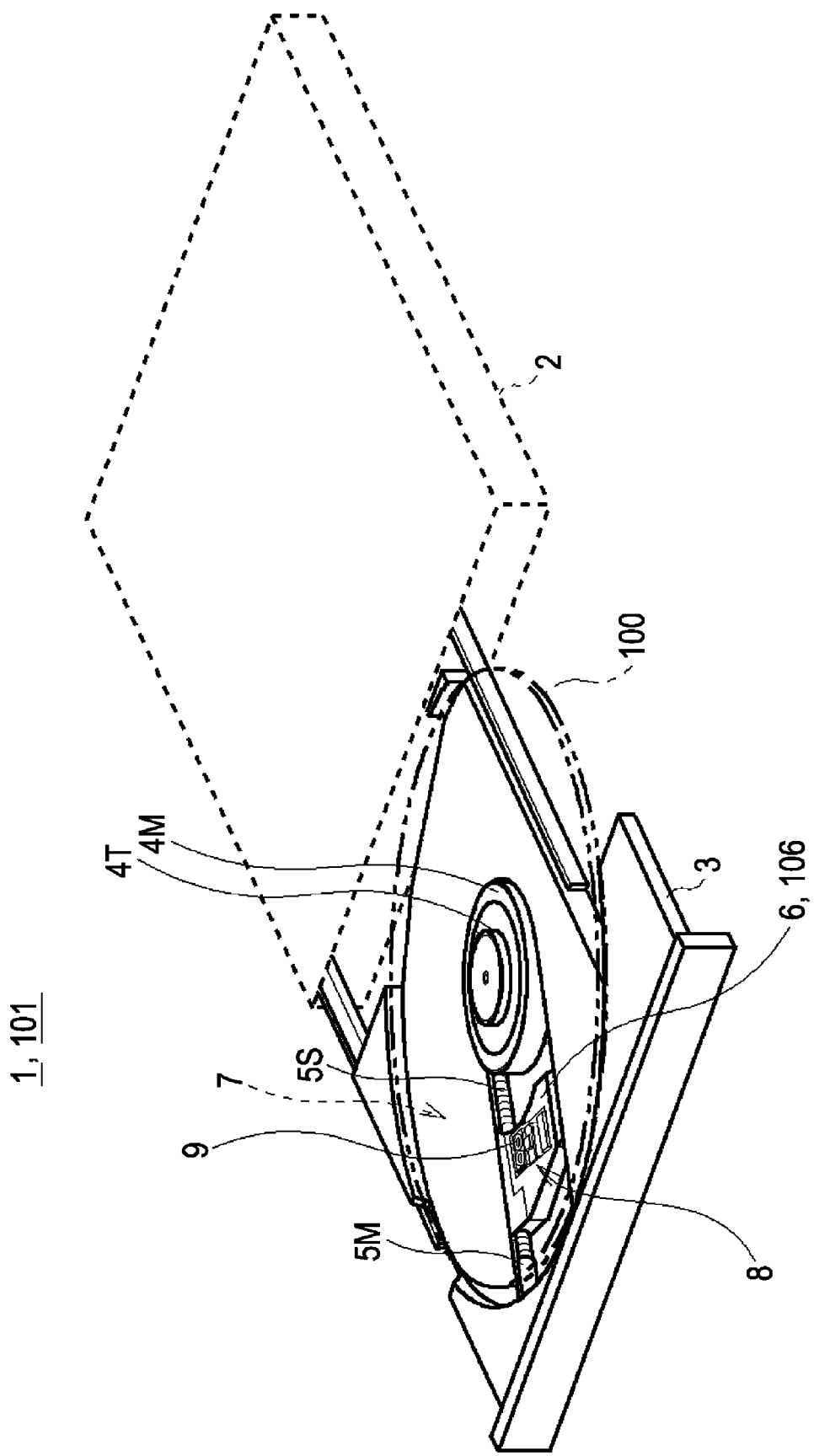
FIG. 1 is a perspective view of an optical disc apparatus.

FIG. 1 illustrates an optical disc apparatus 1, which records information on an optical disc 100 and reproduces information from the optical disc 100.

In practice, the optical disc apparatus 1 is compatible with an optical disc 100C in compact disc (CD) format, an optical disc 100D in digital versatile disc (DVD) format, and an optical disc 100B in Blu-ray Disc® (BD) format.

The optical disc apparatus 1, which is generally low-profiled, includes a case 2 and a tray unit 3. The case 2 covers an outer periphery of the optical disc apparatus 1. The tray unit 3 is installed in the case 2 with a slide mechanism (not shown) therebetween.

It is assumed that the optical disc apparatus 1 is installed, for example, in a low-profile notebook computer. In this case, the case 2 is fixed to a case or the like of the notebook computer.

When optical disc apparatus 1 records information on or reproduces information from the optical disc 100, the tray unit 3 is retracted into the case 2. In order to place the optical disc 100 on the tray unit 3 or remove the optical disc 100 from the tray unit 3, the tray unit 3 is slid out of the case 2 and exposed to the outside, as illustrated in FIG. 1.

A spindle motor 4M and an optical pickup 6 are disposed in the tray unit 3. The spindle motor 4M rotates a turntable 4T so as to rotate the optical disc 100. The optical pickup 6 is moved in the radial direction of the optical disc 100 using a feed motor 5M, a lead screw 5S, and other components.

Figure 2:
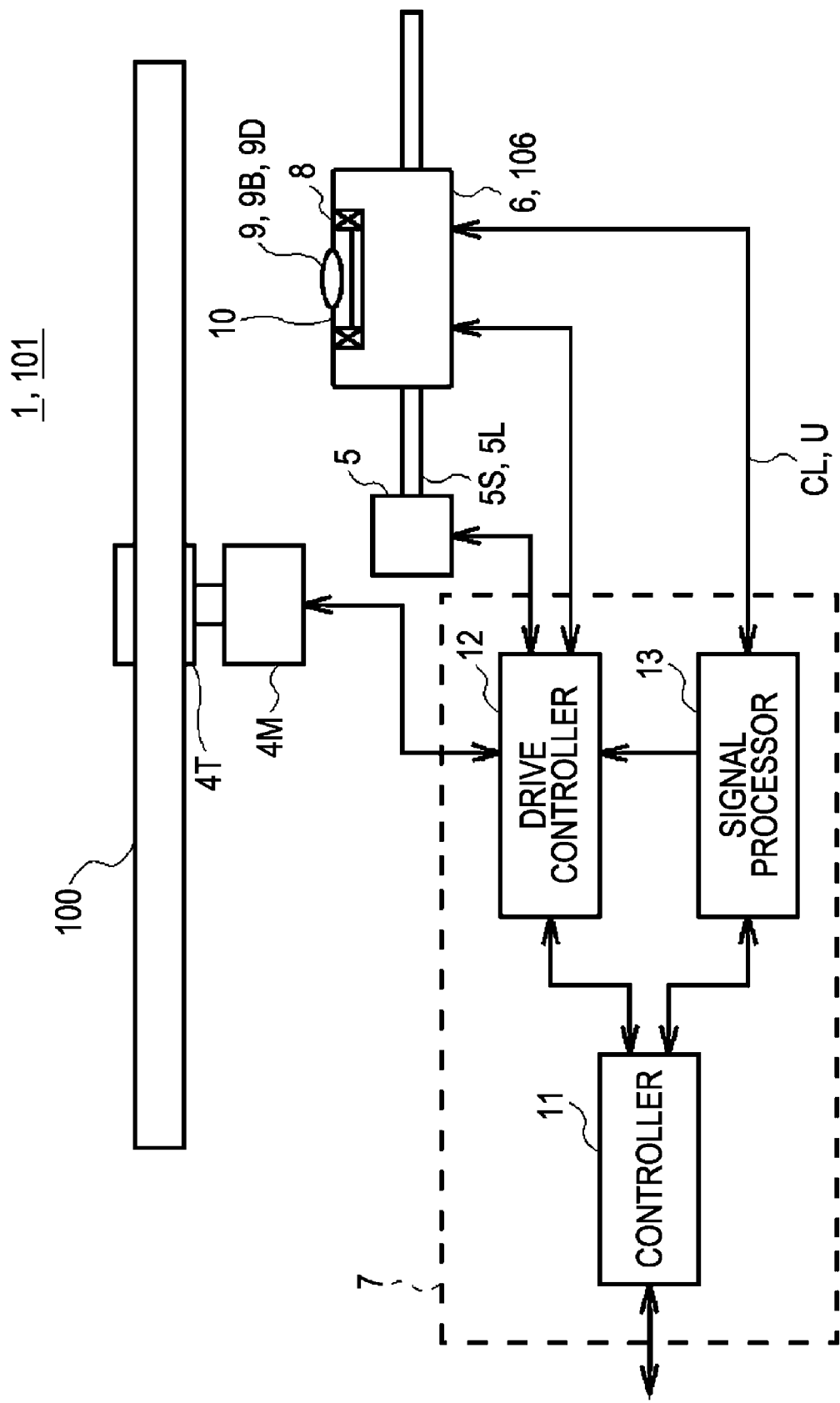
FIG. 2 is a block diagram of the optical disc apparatus.

An electronic circuit board 7, having various electronic components mounted thereon, is disposed in the tray unit 3. As illustrated in FIG. 2, the electronic circuit board 7 functions as a controller 11 that exercises overall control of the optical disc apparatus 1, a drive controller 12 that drives the spindle motor 4M and the like, and a signal processor 13 that processes various signals.

The controller 11 exercises overall control of the optical disc apparatus 1. The controller 11 includes a central processing unit (CPU, not shown), a read only memory (ROM) that stores various programs, and a random access memory (RAM) that is used as a working memory of the CPU.

In practice, the controller 11 executes various programs so as to make the drive controller 12 rotate the spindle motor 4M and the optical disc 100 mounted on the turntable 4T at a desired velocity. The controller 11 makes the drive controller 12 drive the feed motor 5M so as to move the optical pickup 6 along the lead screw 5S, a slide rail 5L, and the like, by a large distance in a tracking direction, that is, toward the center or toward the circumference of the optical disc 100.

The controller 11 makes the drive controller 12 control driving of an actuator 8 of the optical pickup 6. Thus, the controller 11 moves a lens holder 10 holding an objective lens 9 in a focusing direction, that is, toward or away from the optical disc 100, and the controller 11 moves the lens holder 10 by a small distance in the tracking direction, whereby the position of the objective lens 9 is adjusted.

The lens holder 10 holds an objective lens 9B corresponding to the optical disc 100B in BD format, and an objective lens 9D corresponding to both the optical disc 100D in DVD format and the optical disc 100C in CD format. For convenience of description, the objective lenses 9B and 9D are collectively referred to as the objective lens 9.

When recording information on the optical disc 100, for example, the controller 11 supplies the information to the signal processor 13. The signal processor 13 performs predetermined processing, such as encoding and modulation, on the information, so as to generate a laser control signal CL in accordance with the information, and supplies the laser control signal CL to the optical pickup 6.

On the basis of the laser control signal CL supplied from the signal processor 13, the optical pickup 6 emits a light beam L1 with a comparatively high intensity for recording information. The optical pickup 6 adjusts the position of the objective lens 9 and irradiates the optical disc 100 with the light beam L1 through the objective lens 9. Thus, the optical pickup 6 can record information on the optical disc 100.

When reproducing information from the optical disc 100, the controller 11 makes the signal processor 13 supply a laser control signal CL to the optical pickup 6. The optical pickup 6 irradiates the optical disc 100 with the light beam L1 with a comparatively low intensity for reproducing information. The optical pickup 6 detects a reflected light beam L2, which is a portion of the light beam L1 reflected from the optical disk 100. The optical pickup 6 generates a detection signal U in accordance with the detection result and supplies the detection signal U to the signal processor 13.

The signal processor 13 generates a reproduction RF signal SRF on the basis of the detection signal U. The signal processor 13 performs predetermined processing, such as demodulation and decoding, on the reproduction RF signal SRF so as to reproduce information recorded on the optical disc 100.

The signal processor 13 generates a focus error signal SFE and a tracking error signal STE on the basis of the detection signal U. The signal processor 13 supplies the focus error signal SFE and the tracking error signal STE to the drive controller 12 so as to perform focus control and tracking control of the objective lens 9 (described below in detail).

Thus, the optical disc apparatus 1 can record information on or reproduce information from the optical disk 100 by adjusting the position of the objective lens 9 of the optical pickup 6 and by irradiating the optical disc 100 with the light beam L1 through the objective lens 9.

1-2. Structure of Optical Pickup

Figure 3:
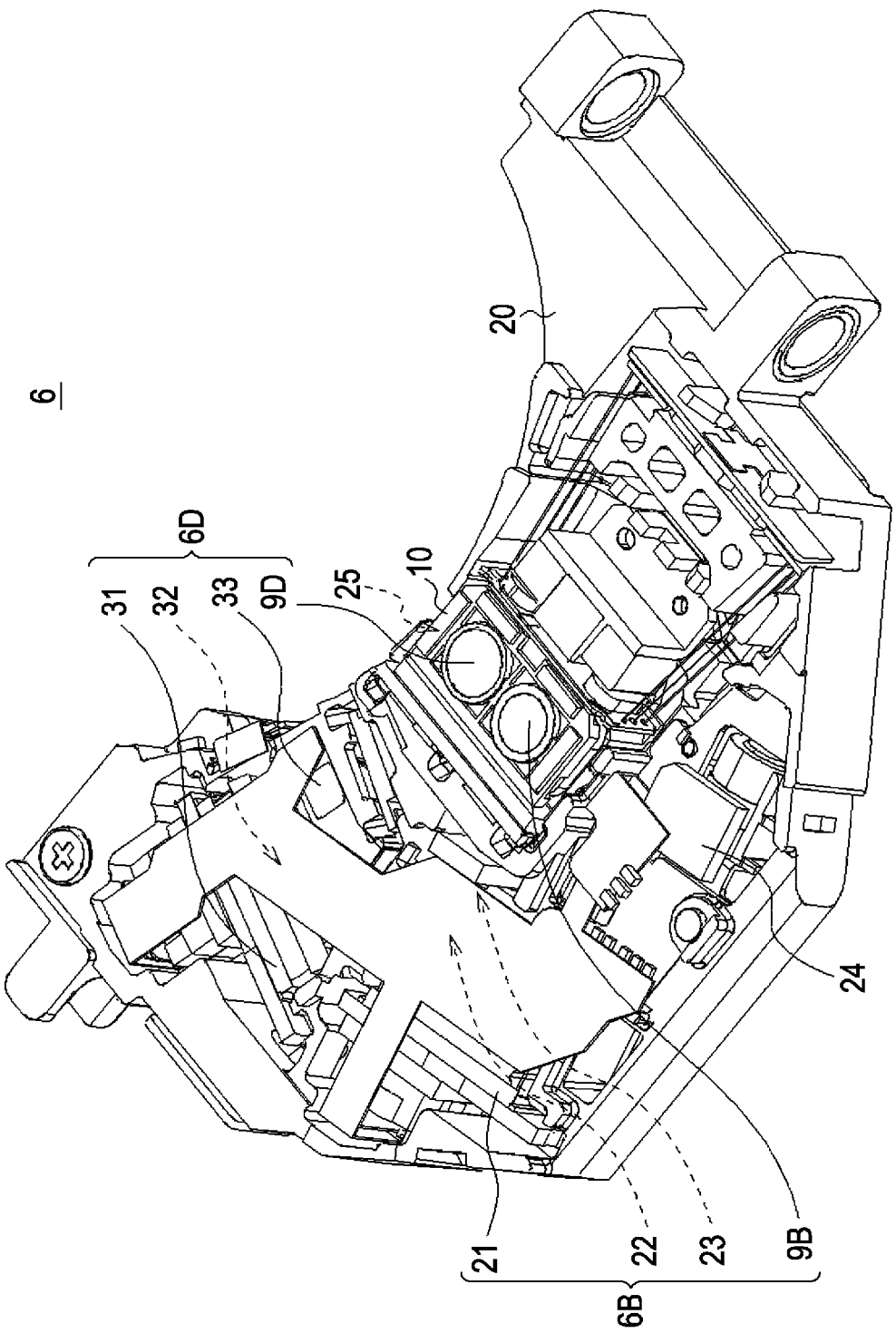
FIG. 3 is a perspective view of an optical pickup.

As illustrated in FIG. 3, the optical pickup 6 includes a pickup base 20 as a base component thereof. The pickup base 20 is generally plate-shaped. An inner periphery of the pickup base 20 has an arc shape corresponding to flat cylinder shapes of the spindle motor 4M and the turntable 4T (FIG. 1). Various optical components are disposed in the pickup base 20.

In practice, the optical pickup 6 includes two optical systems. One is a BD optical system 6B, which corresponds to the optical disc 100B in BD-format, and the other is a DVD/CD optical system 6D, which corresponds to the optical disc 100D in DVD format and to the optical disc 100C in CD format.

Figure 4:
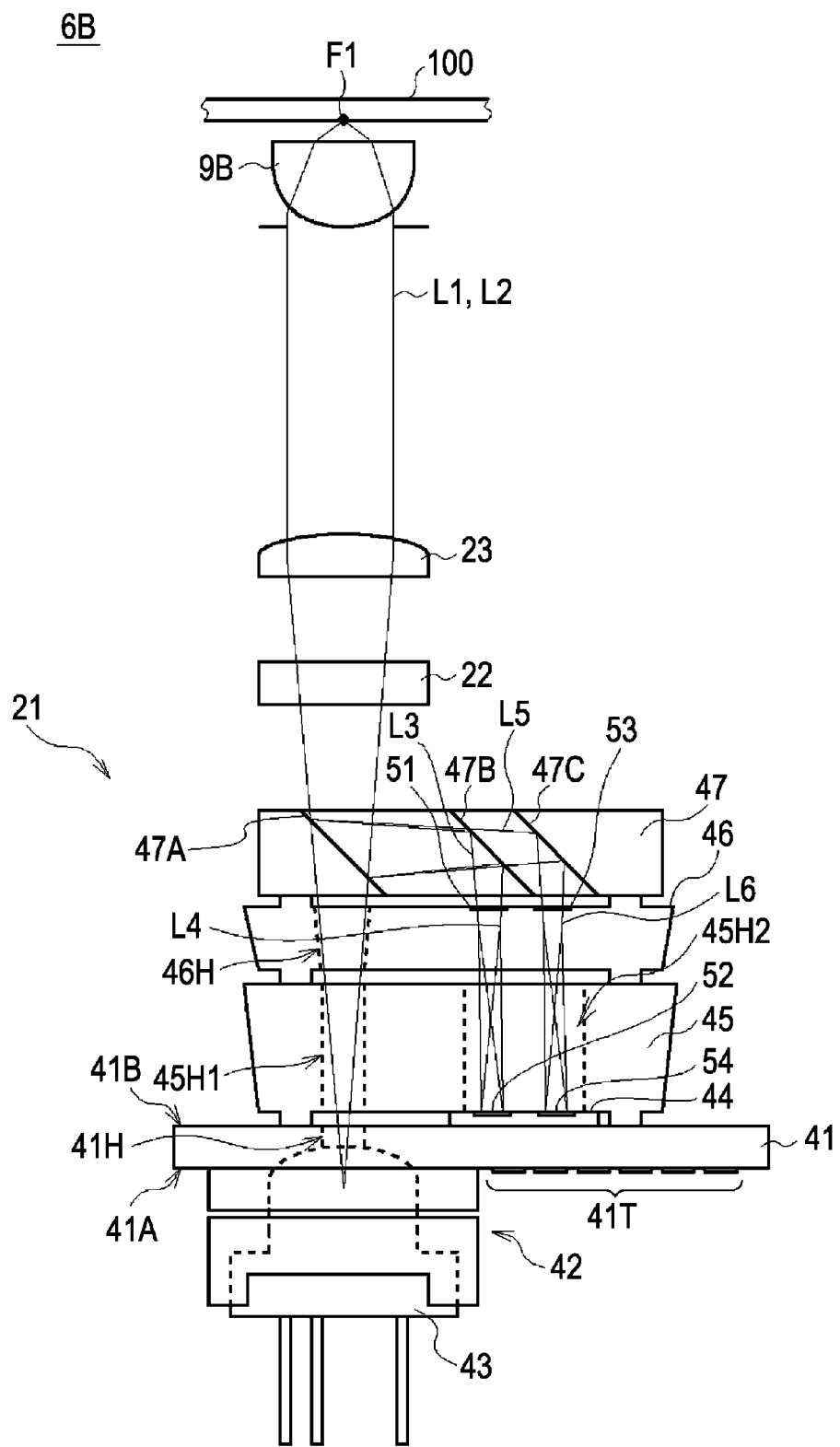
FIG. 4 is a diagram of the optical pickup.

As schematically illustrated in FIG. 4 corresponding to FIG. 3, the BD optical system 6B includes an optical integrated device 21, a quarter wavelength plate 22, a collimator lens 23, and the objective lens 9B described above.

The optical integrated device 21 includes a plurality of optical elements and other components that are integrated with one another. The optical integrated device 21 emits the light beam L1 with which the optical disc 100 is irradiated, receives the reflected light beam L2 reflected from the optical disc 100, and outputs a detection signal U in accordance with the received light.

The optical integrated device 21 includes a support substrate 41, which is generally plate-shaped, as a base component thereof. The support substrate 41 is made of ceramic or other material. A laser diode 43 in a so-called CAN package is mounted on a lower surface 41A (lower side in FIG. 4) with a laser holder 42 therebetween. The laser holder 42 is generally rectangular parallelepiped shaped.

The laser diode 43 includes a laser chip that can emit the light beam L1, which is composed of divergent light at a wavelength of about 405 nm, from an end face thereof. In the first embodiment, it is assumed that the intensity of the light beam L1 is uniform.

A hole 41H is formed in the support substrate 41 so that the light beam L1 can pass through the support substrate from the lower surface 41A to an upper surface 41B opposite the lower surface 41A.

A laser driver 24 is disposed on the pickup base 20 (FIG. 3). The laser driver 24 generates a laser drive signal DL on the basis of the laser control signal CL supplied from the signal processor 13. The laser drive signal DL is supplied to the laser diode 43.

In practice, upon receiving the laser drive signal DL from the laser driver 24, the laser diode 43 emits the light beam L1 at a wavelength of about 405 nm and at an intensity in accordance with the voltage and the current of the laser drive signal DL. The mounting angle of the laser diode 43 is adjusted in such a manner that, for example, about 90% of the light beam L1 is p-polarized and about 10% of the light beam L1 is s-polarized.

The light beam L1 passes through the hole 41H in the support substrate 41 and travels toward the upper surface 41B side of the support substrate 41.

A spacer 45, a compound lens 46, and a prism assembly 47 are stacked on the upper surface 41B of the support substrate 41 in this order.

The spacer 45 is made by injection molding a predetermined resin material, and is generally rectangular parallelepiped shaped. Holes 45H1 and 45H2 extend through the spacer 45 in the vertical direction of FIG. 4. The spacer 45 is bonded to the upper surface 41B of the support substrate 41 using a predetermined adhesive.

The compound lens 46 is made by injection molding a transparent resin material, and is generally rectangular parallelepiped shaped. A hole 46H extends through the compound lens 46 in the vertical direction of FIG. 4.

The hole 46H is substantially frusto-conical so that the light beam L1 can pass therethrough. The upper base of the frustum is larger than the lower base because the beam diameter of the light beam L1, which is composed of divergent light, increases as the light beam L1 travels upward.

As in the case of the spacer 45, the compound lens 46 is bonded to an upper surface of the spacer 45 using a predetermined adhesive.

In practice, the light beam L1 passes through the hole 45H1 in the spacer 45, passes through the hole 46H in the compound lens 46, and enters the prism assembly 47.

The prism assembly 47 is made of a plurality of transparent resin members that are bonded to one another with interfaces therebetween. The prism assembly 47 is generally rectangular parallelepiped shaped. As in the case of the compound lens 46 and the spacer 45, the prism assembly 47 is bonded to an upper surface of the compound lens 46 using a predetermined adhesive.

The reflection coatings 47A, 47B, and 47C are formed on the interfaces of the prism assembly 47. Each of the reflection coatings transmits a predetermined proportion of a light beam and reflects the remaining proportion of the light beam.

The reflection coating 47A is a so-called polarizing beam splitter having different reflectance and transmittance in accordance with the polarization direction of light. For example, the reflection coating 47A transmits almost all the p-polarized component of a light beam and reflects almost all the s-polarized component of the light beam.

In practice, the p-polarized component of the light beam L1 is transmitted by the reflection coating 47A of the prism assembly 47 and enters the quarter wavelength plate 22. The s-polarized component of the light beam L1 is reflected by the reflection coating 47A of the prism assembly 47 and enters a photodetection section for adjusting light intensity (not shown).

The photodetection section for adjusting light intensity generates a light intensity detection signal in accordance with the intensity of the light beam L1 that has entered the photodetection section, and supplies the light intensity detection signal to the laser driver 24. The laser driver 24 recognizes the emission intensity with which the laser diode 43 actually emitted the light beam L1 on the basis of the light intensity detection signal. In order to adjust the emission intensity to a desired value, the laser driver 24 performs feedback control on the laser drive signal DL.

The quarter wavelength plate 22 converts a light beam from a linearly polarized beam to a circularly polarized beam and vice versa. For example, the quarter wavelength plate 22 converts a light beam from a p-polarized beam to a left-hand circularly polarized beam and vice versa, or converts a light beam from a s-polarized beam to a right-hand circularly polarized beam and vice versa.

In practice, the light beam L1, which is p-polarized, is converted by the quarter wavelength plate 22 to a left-hand circularly polarized beam, and enters the collimator lens 23. The light beam L1, which is composed of divergent light, is converted by the collimator lens 23 to parallel light, and enters the objective lens 9B.

In the pickup base 20 (FIG. 3), the light beam L1 is emitted from the optical integrated device 21 and travels through the quarter wavelength plate 22 and the collimator lens 23 in a horizontal direction (that is, a direction substantially parallel to the recording surface of the optical disc 100).

After exiting the collimator lens 23, the light beam L1 is reflected by a raising mirror 25 in a vertical direction (that is, a direction approximately perpendicular to the recording surface of the optical disc 100), and enters the objective lens 9B (FIG. 4).

The objective lens 9B focuses the light beam L1 onto the optical disc 100. The light beam L1 is reflected by the recording surface of the optical disc 100 and changed into a reflected light beam L2 traveling in a direction opposite to that of the light beam L1.

When the light beam L1 is reflected by the recording surface of the optical disc 100, the rotation direction of circular polarization is reversed. Therefore, the reflected light beam L2 becomes a right-hand circularly polarized beam.

The reflected light beam L2 is converted to a parallel beam by the objective lens 9B, and reflected by the raising mirror 25 (FIG. 3) in a horizontal direction. As illustrated in FIG. 4, the reflected light beam L2 is converted to a convergent beam by the collimator lens 23, converted from a right-hand circularly polarized beam to a s-polarized beam (that is, a linearly polarized beam) by the quarter wavelength plate 22, and enters the optical integrated device 21.

In the optical integrated device 21, the reflected light beam L2, which is composed of s-polarized light, is reflected by the reflection coating 47A of the prism assembly 47 toward the reflection coating 47B. The reflection coating 47B transmits about 50% of light, as with a so-called half mirror. About 50% of the reflected light beam L2 is reflected by the reflection coating 47B and becomes a reflected light beam L3.

The reflected light beam L3 is reflected by the reflection coating 47B of the prism assembly 47 in a downward direction, and enters the compound lens 46. In a portion of an upper surface of the compound lens 46 through which the reflected light beam L3 enters the compound lens 46, a light beam splitting section 51 including a diffraction grating is formed.

The light beam splitting section 51 diffracts the reflected light beam L3 and splits the light beam L3 into a plurality of light beams (described below in detail). Hereinafter, the plurality of light beams that have been split by the light beam splitting section 51 are collectively referred to as a reflected light beam L4.

The reflected light beam L4 exits through the lower surface of the compound lens 46 in a substantially downward direction, passes through the hole 45H2 in the spacer 45, and is incident on a photodetector 44.

The photodetector 44 is generally plate-shaped. The photodetector 44 is mounted on the upper surface 41B of the support substrate 41. A photodetection section 52 is disposed on an upper surface of the photodetector 44 at a position at which the reflected light beam L4 is incident. The photodetection section 52 includes a plurality of photodetection devices.

The reflected light beam L2 is transmitted by about 50% by the reflection coating 47B of the prism assembly 47 and becomes a reflected light beam L5. The reflected light beam L5 is reflected by the reflection coating 47C in a downward direction, and enters the compound lens 46.

A light beam splitting section 53 including a diffraction grating is disposed on an upper surface of the compound lens 46 at a position through which the reflected light beam L5 enters the compound lens 46, that is, at a small distance from the light beam splitting section 51. The light beam splitting section 53 diffracts the reflected light beam L5 so as to split the light beam L5 into a plurality of light beams (described below in detail). Hereinafter, the plurality of light beams that have been split by the light beam splitting section 53 are collectively referred to as a reflected light beam L6.

The reflected light beam L6 exits through the lower surface of the compound lens 46 in a substantially downward direction, passes through the hole 45H2 in the spacer 45, and is incident on the photodetector 44.

A photodetection section 54 is disposed on an upper surface of the photodetector 44 at a position at which the reflected light beam L6 is incident, that is, at a small distance from the photodetection section 52. The photodetection section 54 includes a plurality of photodetection devices.

The photodetector 44 generates the detection signal U in accordance with the intensity of light received by the photodetection devices of the photodetection sections 52 and 54. The photodetector 44 amplifies the detection signal U using an amplifier circuit (not shown) and outputs the detection signal U to the signal processor 13 (FIG. 2) through terminals 41T disposed on the lower surface 41A of the support substrate 41.

The signal processor 13 performs a predetermined operation on a plurality of detection signals U, and generates the focus error signal SFE and the tracking error signal STE, which are described above.

Thus, in the BD optical system 6B, the light beam L1 is emitted from the laser diode 43 of the optical integrated device 21, travels through various optical components, and is incident on the optical disc 100 in BD-format.

Moreover, in the BD optical system 6B, the reflected light beam L2, which is a portion of light beam L1 reflected from the recording surface of the optical disc 100, travels through various optical components and is received by the photodetector 44 of the optical integrated device 21. The photodetector 44 generates the light detection signal U in accordance with the received light.

The DVD/CD optical system 6D (FIG. 3) has a general structure similar to that of the BD optical system 6B. The DVD/CD optical system 6D includes an optical integrated device 31, a quarter wavelength plate 32, and a collimator lens 33, which respectively correspond to the optical integrated device 21, the quarter wavelength plate 22, and the collimator lens 23 of the BD optical system 6B. The DVD/CD optical system 6D includes the objective lens 9D, which corresponds to the objective lens 9B of the BD optical system 6B.

As in the BD optical system 6B, in the DVD/CD optical system 6D, a light beam is emitted from a laser diode of the optical integrated device 31, travels through various optical components, and is incident on the optical disc 100 in DVD-format or in CD-format.

As in the BD optical system 6B, in the DVD/CD optical system 6D, the reflected light beam, which is a portion of a light beam reflected from the recording surface of the optical disc 100, travels through various optical components and is received by a photodetector of the optical integrated device 31. The photodetector generates the light detection signal U in accordance with the received light.

1-3. Reflected Light Beam

Figure 5:
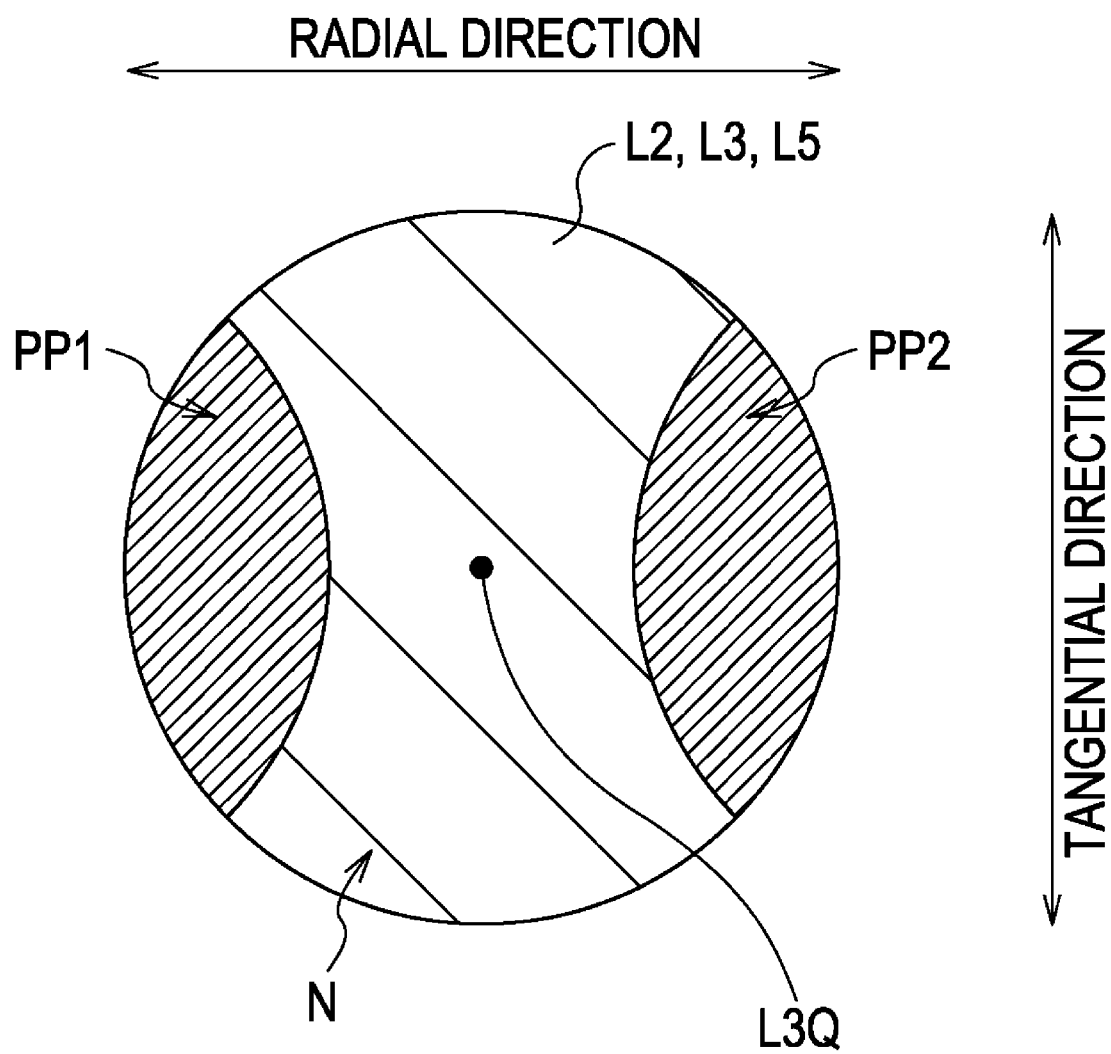
FIG. 5 is a diagram of a cross-section of a reflected light beam.

As illustrated in FIG. 5, a cross-section of the reflected light beam L2 is generally circular. Push-pull regions PP1 and PP2, which serve as superposed regions, are formed at two ends of the cross-section of the light beam in the radial direction, that is, at the left and right ends of FIG. 5.

The push-pull regions PP1 and PP2 are regions in which, when the light beam L1 is reflected by the recording surface of the optical disc 100, reflected diffracted light is superposed on simply reflected light. The reflected diffracted light is a reflected portion of the light beam L1 that has been diffracted by grooves of a track formed in the recording surface.

When the light beam L1 is incident on the optical disc 100 at a position deviated from a target position of the track in the tracking direction, the intensity of light in each of the push-pull regions PP1 and PP2 changes due to the structure of the grooves of the track in accordance with the principle of diffraction.

The optical disc apparatus 1 detects the intensities of light in the push-pull regions PP1 and PP2 (described below in detail) and performs the tracking control on the basis of the detection result.

1-4. Generation of Detection Signal by First Optical System

As described above, in the optical integrated device 21, a portion of the reflected light beam L2 is reflected by the reflection coating 47B of the prism assembly 47 and becomes the reflected light beam L3. In the optical integrated device 21, the reflected light beam L3 is split into a plurality of portions by the light beam splitting section 51 and becomes the reflected light beam L4, and the reflected light beam L4 is detected by the photodetection section 52 of the photodetector 44. Hereinafter, the optical system including the reflection coating 47B, the light beam splitting section 51, and the photodetection section 52 is referred to as a first optical system 21A.

1-4-1. Structure of Light Beam Splitting Section

Figure 6A:
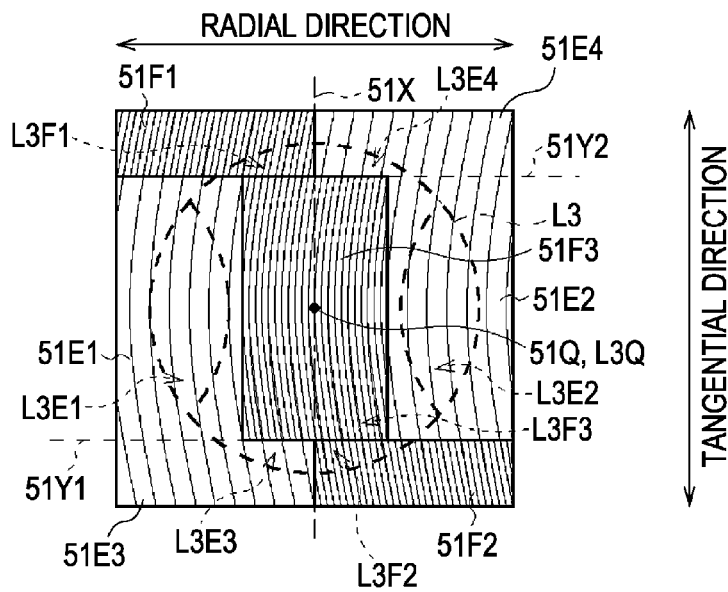
FIGS. 6A and 6B are diagrams of a light beam splitting section and a photodetection section according to a first embodiment.

As illustrated in FIG. 6A, the light beam splitting section 51 of the first optical system 21A is generally square-shaped in top view. The light beam splitting section 51 is divided into the regions 51E1, 51E2, 51F1, 51F2, and 51F3.

The region 51F1 is a rectangular region on a side (the left side of FIG. 6A) of an imaginary center line 51X that divides the light beam splitting section 51 in the radial direction and at an end of the light beam splitting section 51 in the tangential direction (upper end of FIG. 6A). The region 51F2 corresponds to a region obtained by rotating the region 51F1 by 180 degrees around an imaginary center 51Q of the light beam splitting section 51.

In practice, the region 51F1 is designed in such a manner that, when an ideal reflected light beam L3 is incident on the light beam splitting section 51, a portion of the reflected light beam L3, in cross-sectional view, at one end in the tangential direction and on one side in the radial direction is incident on the region 51F1.

The region 51F2 is designed in such a manner that a portion of the ideal reflected light beam L3, in cross-sectional view, at the other end in the tangential direction and on the other side of the region 51F1 in the radial direction is incident on the region 51F2.

A region 51F3, which serves as a connection region, is a rectangular region connecting the regions 51F1 and 51F2 in the tangential direction and having a predetermined width in the radial direction.

For convenience of description, the portions of the reflected light beam L3 that pass through the regions 51F1, 51F2, and 51F3 are referred to as reflected light beams L3F1, L3F2, and L3F3, respectively. A portion of the reflected light beam L3 that passes through the region 51E1 is divided by an imaginary extension line 51Y1 into two subportions that are referred to as light beams L3E1 and L3E3. A portion of the reflected light beam L3 that passes through the region 51E2 is divided by an imaginary extension line 51Y2 into two subportions that are referred to as reflected light beams L3E2 and L3E4. The imaginary extension lines 51Y1 and 51Y2 are extensions of boundary lines of the region 51F3 at the ends of the region 51F3 in the tangential direction.

The region 51F3 is designed in such a manner that the area thereof is approximately equal to the sum of the areas of portions of the regions 51E1 and 51E2 on which the reflected light beam L3 is incident, that is, the sum of the projected areas of the reflected light beams L3E1 and L3E2.

The regions 51E1 and 51E2, which are substantially L-shaped, are regions of the light beam splitting section 51 excluding the regions 51F1, 51F2, and 51F3.

A diffraction grating is formed on each of the regions 51F1, 51F2, and 51F3 (hereinafter collectively referred to as a region 51F), and on each of the regions 51E1 and 51E2 (hereinafter collectively referred to as a region 51E).

Figure 7:
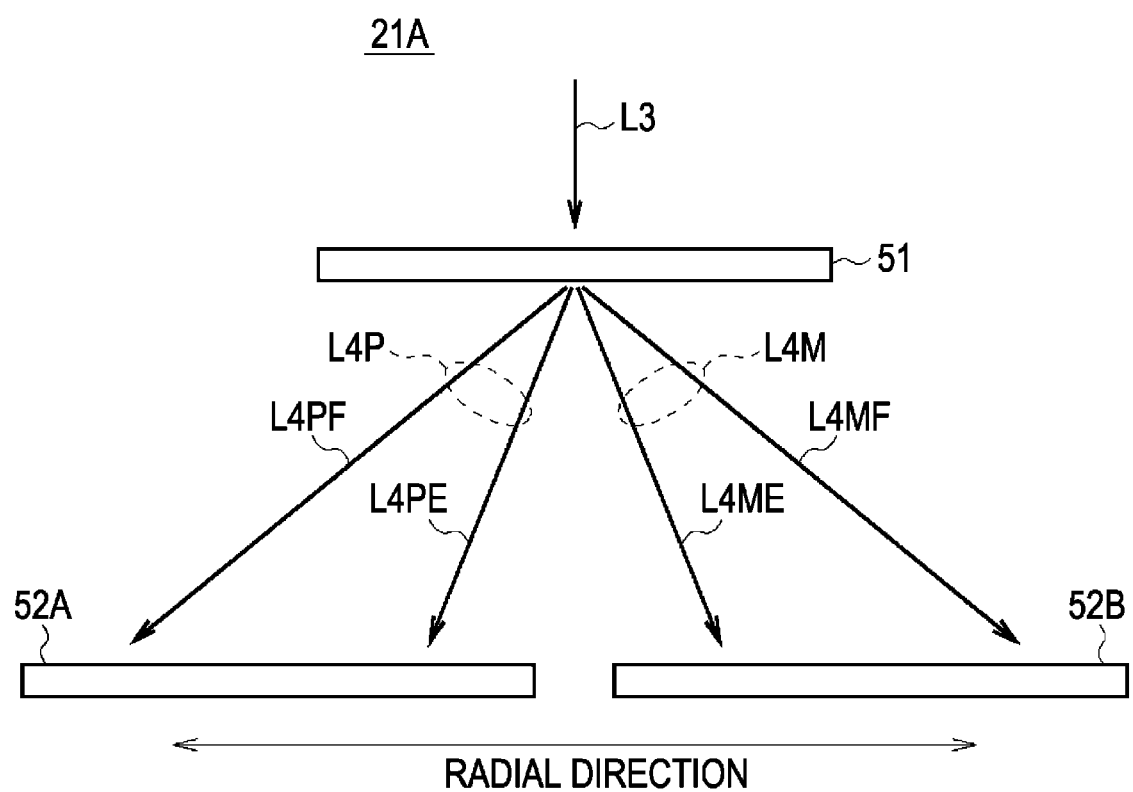
FIG. 7 is a diagram illustrating the directions in which a light beam is split in a first optical system.

In practice, the light beam splitting section 51 diffracts the reflected light beam L3 in the radial direction, and roughly splits the reflected light beam L3 into a reflected light beam L4P composed of +1 order light and a reflected light beam L4M composed of −1 order light, as schematically illustrated in FIG. 7.

The diffraction gratings formed in the region 51F (the regions 51F1, 51F2, and 51F3) have comparatively fine pitches. The diffraction gratings formed in the region 51E (the regions 51E1 and 51E2) have comparatively coarse pitches. That is, the regions 51F and 51E of the light beam splitting section 51 diffract the reflected light beam L3 at different diffraction angles.

The region 51F diffracts portions of the reflected light beam L3 incident on the region 51F, that is, the reflected light beams L3F1, L3F2, and L3F3, at comparatively large diffraction angles. Thus, the region 51F generates a reflected light beam L4PF composed of +1 order light and a reflected light beam L4MF composed of −1 order light (FIG. 7).

The reflected light beam L4PF includes reflected light beams L4PF1 and L4PF2 that have passed through the regions 51F1 and 51F2 and a reflected light beam L4PF3 that has passed through the region 51F3. The reflected light beams L4PF1 and L4PF2 serve as two end light beams. The reflected light beam L4PF3 serves as a connection light beam.

On the other hand, the region 51E diffracts portions of the reflected light beam L3 incident on the region 51E, that is, the reflected light beams L3E1, L3E2, L3E3, and L3E4, at comparatively small diffraction angles. Thus, the region 51E generates a reflected light beam L4PE composed of +1 order light and a reflected light beam L4ME composed of −1 order light (FIG. 7).

The reflected light beam L4PE, which serves as a residual light beam, includes four reflected light beams L4PE1, L4PE2, L4PE3, and L4PE4 that have passed through the regions 51E1, 51E2, 51E3, and 51E4, respectively.

1-4-2. Structure of Photodetection Section

Figure 6B:
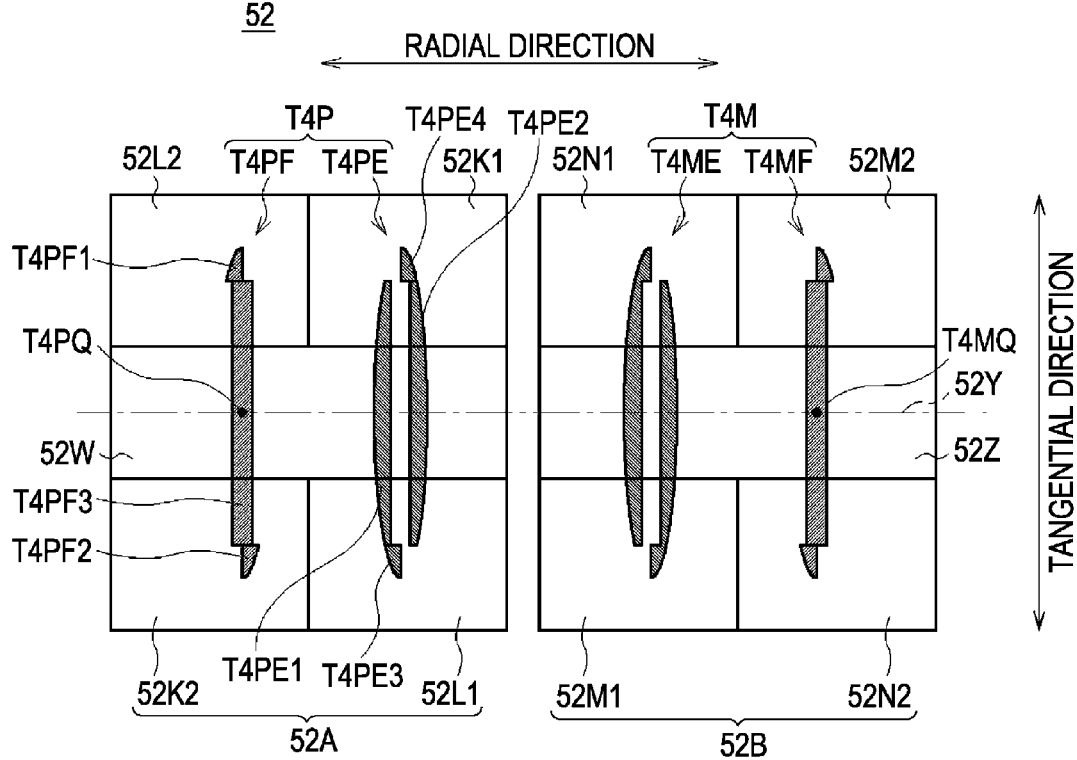

As illustrated in FIG. 6B, the photodetection section 52 includes a photodetection device group 52A corresponding to the reflected light beam L4P composed of +1 order light and a photodetection device group 52B corresponding to the reflected light beam L4M composed of −1 order light.

The photodetection device group 52A, which serves as positive photodetection devices, is generally rectangular in top view. The photodetection device group 52A is divided into three portions in the tangential direction, and the middle portion is a photodetection device 52W.

The portions of the photodetection device group 52A at two ends in the tangential direction are each divided into two subportions in the radial direction. The subportions are photodetection devices 52K1, 52L2, 52L1, and 52K2.

As with the photodetection device group 52A, the photodetection device group 52B, which serves as negative photodetection devices, is generally rectangular. The photodetection device group 52B is divided into three portions in the tangential direction, and the middle portion is a photodetection device 52Z.

As with the photodetection device group 52A, the portions of the photodetection device group 52B at two ends in the tangential direction are each divided into two subportions in the radial direction. The subportions are photodetection devices 52M2, 52N1, 52M1, and 52N2.

The diffraction gratings formed in the regions 51F and 51E of the light beam splitting section 51 have an optical function similar to that of a cylindrical lens and focus the reflected light beams L4PF, L4PE, L4MF, and L4ME in the radial direction.

With this structure, as illustrated in FIG. 6B, a spot T4PE is formed on the photodetection devices 52K1, 52W, and 52L1 of the photodetection device group 52A when the photodetection devices 52K1, 52W, and 52L1 are irradiated with the reflected light beam L4PE, which serves as a residual light beam. The spot T4PE has a shape that is generally squeezed in the radial direction and elongated in the tangential direction.

The spot T4PE includes spots T4PE1, T4PE2, T4PE3, and T4PE4, which are formed by the reflected light beams L4PE1, L4PE2, L4PE3, and L4PE4, respectively.

The spots T4PE3 and T4PE4, which have sectorial shapes, are formed on the photodetection device 52L1 and 52K1, respectively. The spots T4PE1 and T4PE2, which have substantially semi-elliptical shapes extending in the tangential direction, are formed on the photodetection devices 52L1, 52W, and 52K1. The spots T4PE1 and T4PE2 are connected to the spots T4PE3 and T4PE4, respectively.

A spot T4PF is formed on the photodetection devices 52K2, 52W, and 52L2 of the photodetection device group 52A when the photodetection devices 52K2, 52W, and 52L2 are irradiated with the reflected light beam L4PF. The spot T4PF has a shape that is generally squeezed in the radial direction and elongated in the tangential direction.

The spot T4PF includes spots T4PF1, T4PF2, and T4PF3, which are formed by the reflected light beams L4PF1, L4PF2, and L4PF3, respectively.

The spots T4PF1 and T4PF2, which have sectorial shapes, are formed on the photodetection devices 52L2 and 52K2, respectively. The spot T4PF3, which has a rectangular shape, is formed on the photodetection devices 52L2, 52W, and 52K2. The spot T4PF3 connects the spots T4PF1 and T4PF2 in the tangential direction.

A spot T4ME is formed on the photodetection devices 52M1, 52Z, and 52N1 of the photodetection device group 52B when the photodetection devices 52M1, 52Z, and 52N1 are irradiated with the reflected light beam L4ME. The spot T4ME has a shape that is generally squeezed in the radial direction and elongated in the tangential direction.

A spot T4MF is formed on the photodetection devices 52M2, 52Z, and 52N2 of the photodetection device group 52B when the photodetection devices 52M2, 52Z, and 52N are irradiated with the reflected light beam L4MF. The spot T4MF has a shape that is generally squeezed in the radial direction and elongated in the tangential direction.

In the first optical system 21A, the diffraction angles of the diffraction gratings formed in the regions 51F and 51E of the light beam splitting section 51 and the sizes and dispositions of the photodetection device groups 52A and 52B are appropriately designed.

Thus, the spots T4PF and T4PE (hereinafter collectively referred to as a spot T4P) are formed on the photodetection device group 52A, and the spots T4MF and T4ME (hereinafter collectively referred to as a spot T4M) are formed on the photodetection devices 52B.

Centers T4PQ and T4MQ of the photodetection device groups 52A and 52B correspond to the center L3Q (FIG. 6A), which is an imaginary center of the reflected light beam L3. The centers L4PQ and L4MQ are located on an imaginary center line 52Y that divides the photodetection device groups 52A and 52B in the tangential direction.

The photodetection devices 52K1, 52L1, 52K2, 52L2, and 52W of the photodetection device group 52A each receive a portion of the reflected light beam L4P corresponding to a portion of the spot T4P. In accordance with the amounts of received light, the photodetection devices 52K1, 52L1, 52K2, 52L2, and 52W generate detection signals UK1, UL1, UK2, UL2, and UW, respectively.

The photodetection devices 52M1, 52N1, 52M2, 52N2, and 52Z of the photodetection device group 52B each receive a portion of the reflected light beam L4M corresponding to a portion of the spot T4M. In accordance with the amounts of received light, the photodetection devices 52M1, 52N1, 52M2, 52N2, and 52Z generate detection signals UM1, UN1, UM2, UN2 and UZ, respectively.

Hereinafter, the spots T4PF, T4PE, T4MF, and T4ME are collectively referred to as a spot T4. The detection signals UK1, UL1, UK2, UL2, UW, UM1, UN1, UM2, UN2, and UZ are collectively referred to as a detection signal U.

As described above, the photodetector 44 (FIG. 4) amplifies the detection signal U using an amplifier circuit (not shown), and outputs the detection signal U to the signal processor 13 (FIG. 2) through the terminals 41T disposed on the lower surface of the support substrate 41.

1-4-3. Generation of Focus Error Signal

The optical disc apparatus 1 performs focus control using a spot size detecting (SSD) method by changing the lengths of the spots T4P and T4M in the tangential direction in accordance with the focal condition of the light beam L1.

Figure 8A:
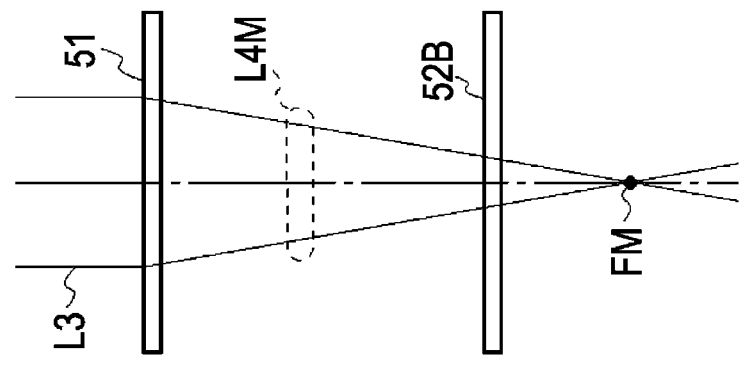
FIGS. 8A and 8B are diagrams illustrating movements of focal positions of the light beam splitting section.

In practice, as illustrated in FIG. 8A, the diffraction gratings formed on the regions 51F and 51E function as a cylindrical lens and form a focus FP of the reflected light beam L4P, which is composed of +1 order light, in front of the photodetection device group 52A (in FIG. 8A, above the photodetection device group 52A). The focus FP is the focus of the reflected light beam L4P in the tangential direction.

Figure 8B:
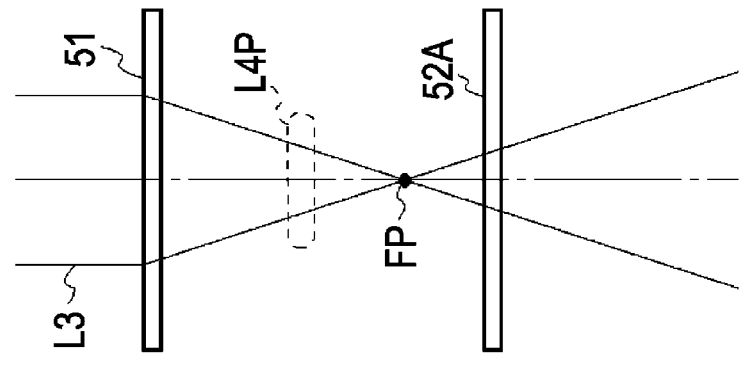

At the same time, as illustrated in FIG. 8B, the diffraction gratings formed on the regions 51F and 51E function as a cylindrical lens and form a focus FM of the reflected light beam L4M, which is composed of −1 order light, beyond the photodetection device group 52B (in FIG. 8B, below the photodetection device group 52B). The focus FM is the focus of the reflected light beam L4M in the tangential direction.

First, suppose that a focus F1 (FIG. 4) of the light beam L1 is on the recording surface of the optical disc 100 and the amount of defocus is zero, that is, the beam is in focus. In this case, as illustrated in FIG. 9A, on the photodetection section 52, the spot T4P formed on the photodetection device group 52A and the spot T4M formed on the photodetection device group 52B have approximately equal lengths in the tangential direction.

Second, suppose that the focus F1 (FIG. 4) of the light beam L1 is beyond the recording surface of the optical disc 100, that is, the beam is out of focus. In this case, the focuses FP and FM move in a direction away from the light beam splitting section 51 (that is, downward in FIGS. 8A and 8B).

Figure 9A:
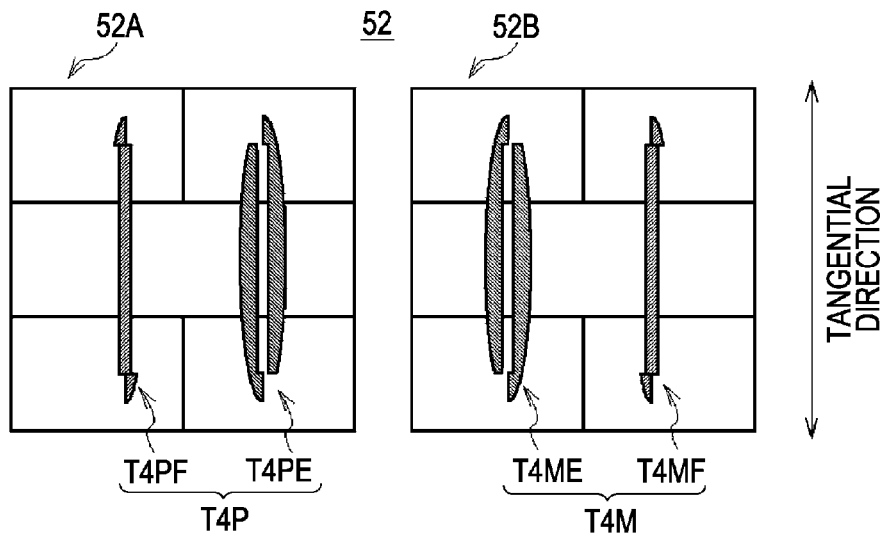
FIGS. 9A to 9C are diagrams illustrating changes in the shapes of spots used for a spot size detecting (SSD) method.
Figure 9B:
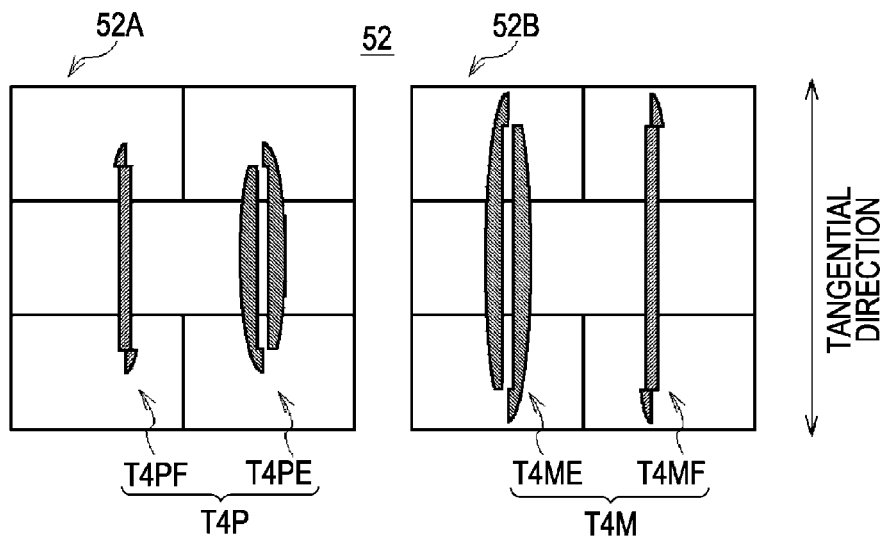

At this time, as illustrated in FIG. 9B corresponding to FIG. 9A, on the photodetection section 52, the spot T4P contracts in the tangential direction and the spot T4M elongates in tangential the direction.

Third, suppose that the focus F1 (FIG. 4) of the light beam L1 is in front of the recording surface of the optical disc 100, that is, the beam is out of focus. In this case, the focuses FP and FM move in a direction toward the light beam splitting section 51 (that is, upward in FIGS. 8A and 8B).

Figure 9C:
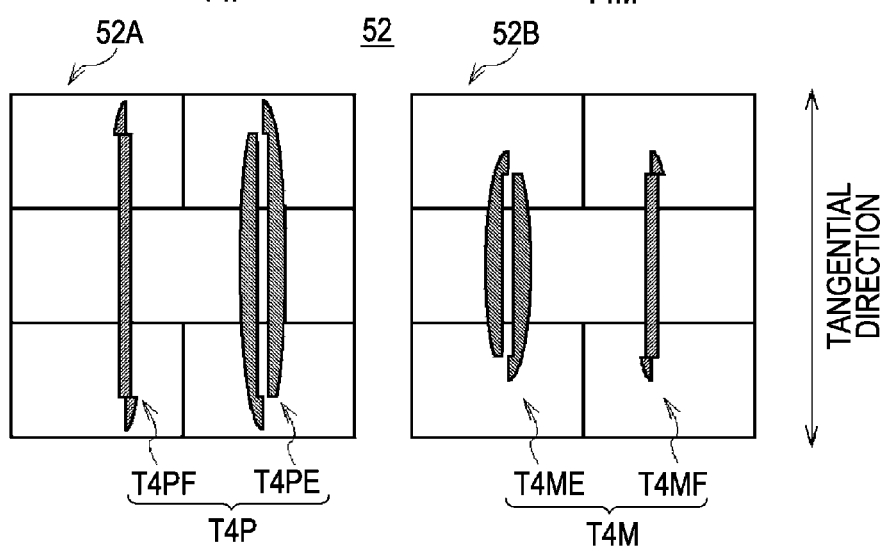

At this time, as illustrated in FIG. 9C corresponding to FIG. 9A, in contrast to the case of FIG. 9B, on the photodetection section 52, the spot T4P elongates in the tangential direction and the spot T4M contracts in the tangential direction.

The extension length and the contraction length of the spots T4P and T4M shown in FIGS. 9B and 9C are approximately proportional to the amount of defocus of the light beam L1.

Using the spot size detecting (SSD) method, the signal processor 13 calculates the focus error signal SFE using equation (1).

$$SFE = \{UW + (UM + UN)\} - \{UZ + (UK + UL)\} \quad (1)$$

Intermediate values UK, UL, UM, and UN are calculated using equations (2) on the basis of the detection signal U.

$$UK = UK1 + UK2$$

$$UL = UL1 + UL2$$

$$UM = UM1 + UM2$$

$$UN = UN1 + UN2 \quad (2)$$

Thus, the signal processor 13 can calculate the focus error signal SFE in accordance with the amount of defocus of the light beam L1.

1-4-4. Generation of Lens Shift Signal

The optical disc apparatus 1 calculates the movement amount of the objective lens 9B in the tracking direction, that is, the amount of lens shift using a method described in Japanese Unexamined Patent Application Publication No. 2007-265595.

Figure 10A:
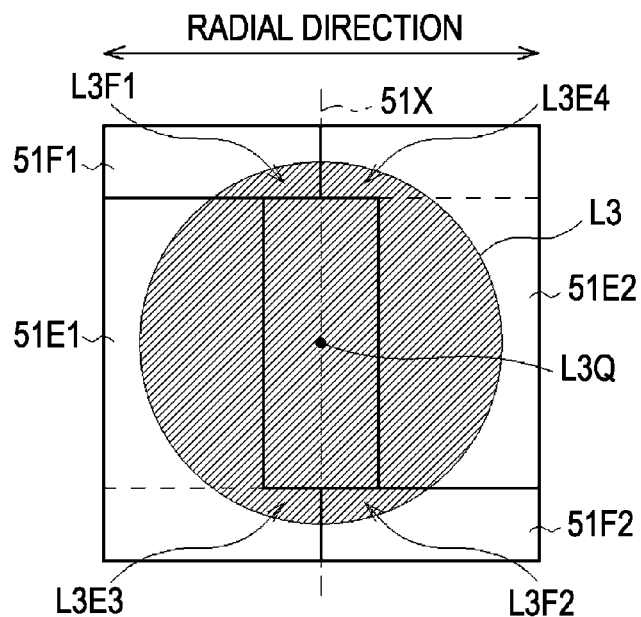
FIGS. 10A and 10B are diagrams illustrating a relationship between lens shift and the shapes of spots.
Figure 10B:
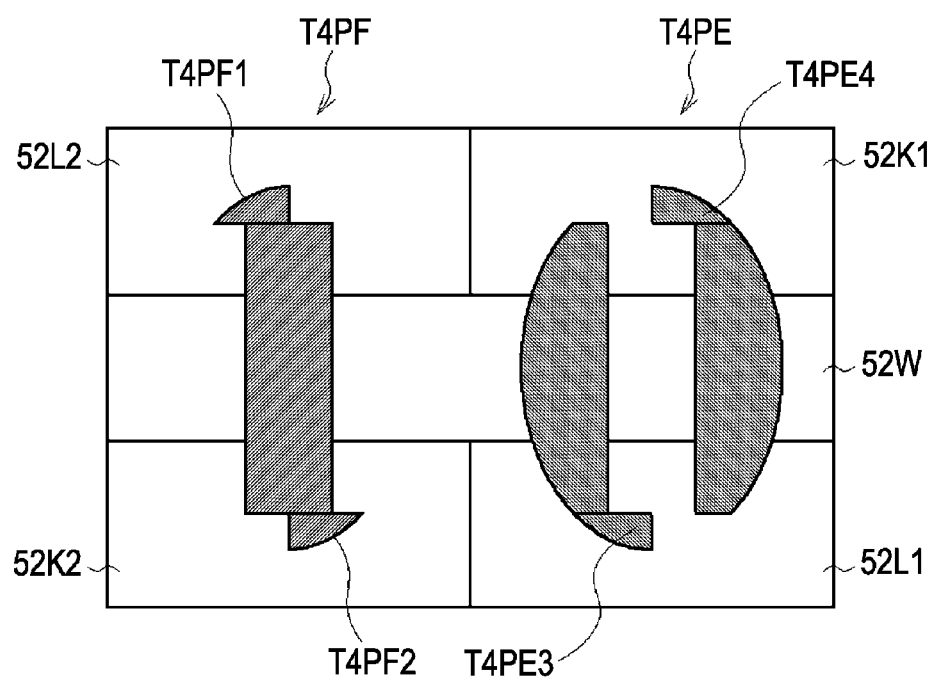

First, as illustrated in FIGS. 10A and 10B respectively corresponding to FIGS. 6A and 6B, suppose that the imaginary center L3Q of the reflected light beam L3 is on the imaginary center line 51X of the light beam splitting section 51, that is, the amount of lens shift is zero.

In FIG. 10B, for convenience of description, the photodetection device group 52A and the spots T4PF and T4PE are enlarged in the radial direction. Description and illustration of the photodetection device group 52B are omitted, since the photodetection device group 52B is similar to the photodetection device group 52A.

If the amount of lens shift of the objective lens 9B (FIG. 4) is zero, the areas of the regions 51F1 and 51F2 irradiated with the light beam L3, that is, the cross-sectional areas of the reflected light beams L3F1 and L3F2 are approximately equal. Thus, the areas of portions of the spot T4PF on the photodetection devices 52K2 and 52L2 are approximately equal. Therefore, the detection signals UL2 and UK2 are approximately equal.

The areas of portions of the spot T4PE on the photodetection devices 52K1 and 52L1 of the photodetection device group 52A are approximately equal. Thus, the amounts of light incident on the portions are approximately equal. Therefore, the detection signals UL1 and UK1 are approximately equal.

Figure 11A:
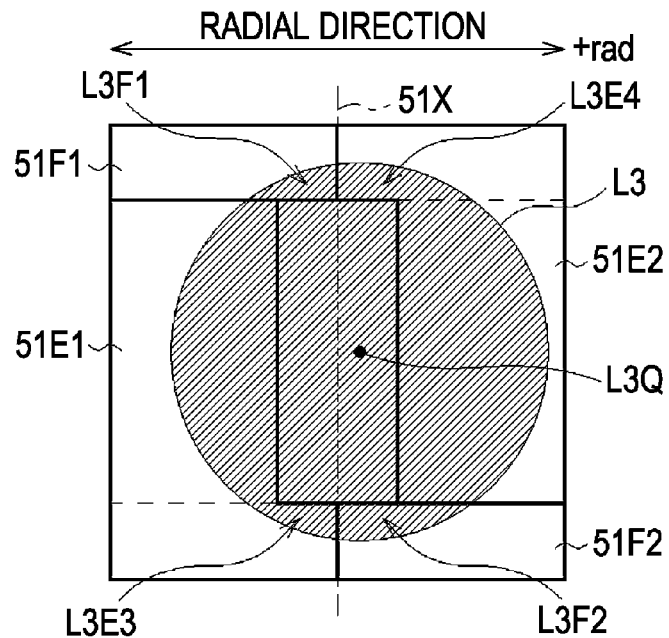
FIGS. 11A and 11B are diagrams illustrating a relationship between lens shift and the shapes of spots.
Figure 11B:
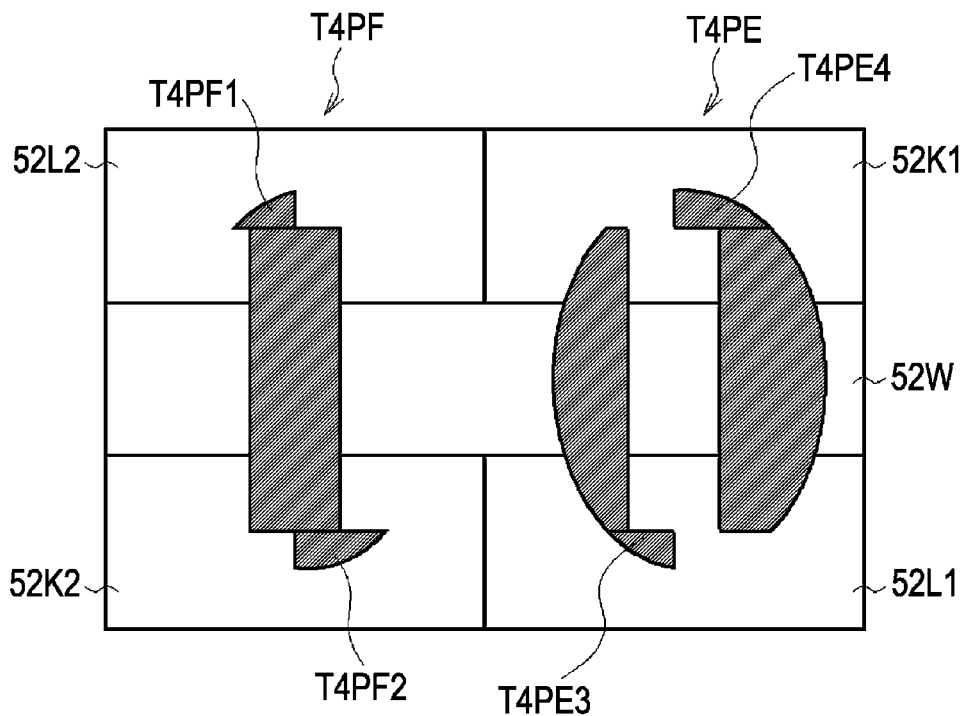

Second, as illustrated in FIGS. 11A and 11B respectively corresponding to FIGS. 10A and 10B, suppose that the reflected light beam L3 is incident on a position that is deviated in the +rad direction due to lens shift. The imaginary center L3Q of the reflected light beam L3 is off the imaginary center line 51X of the light beam splitting section 51 in the +rad direction.

In this case, as compared with the case of FIG. 10A, the area of a portion of the reflected light beam L3 incident on the region 51F2, that is, the area of the reflected light beam L3F2, increases. The area of a portion of the reflected light beam L3 incident on the region 51F1, that is, the area of the reflected light beam L3F1 decreases.

Thus, among the portions of the spot T4PF, the area of the spot T4PF2 increases, and the area of the spot T4PF1 decreases. Therefore, the value of the detection signal UK2 generated by the photodetection device 52K2 increases, and the value of the detection signal UL2 generated by the photodetection device 52L2 decreases.

In this case, among the portions of the reflected light beam L3, the cross-sectional area of the reflected light beam L3E4 increases, and the cross-sectional area of the reflected light beam L3E3 decreases. Thus, among the portions of the spot T4PE, the area of the spot T4PE4 increases, and the area of the spot T4PE3 decreases. Therefore, the value of the detection signal UK1 generated by the photodetection device 52K1 increases, and the value of the detection signal UL1 generated by the photodetection device 52L1 decreases.

Figure 12A:
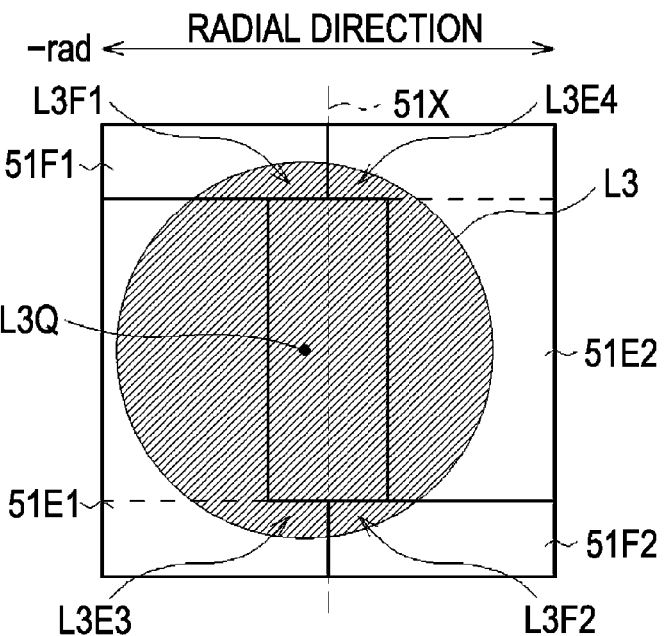
FIGS. 12A and 12B are diagrams illustrating a relationship between lens shift and the shapes of spots.
Figure 12B:
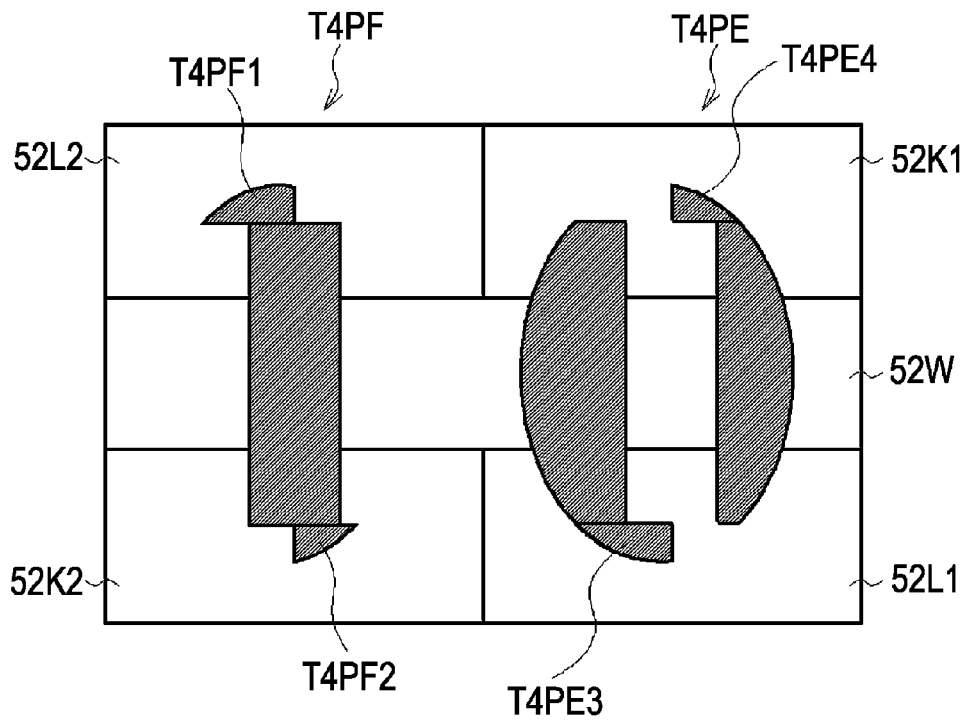

Third, as illustrated in FIGS. 12A and 12B respectively corresponding to FIGS. 10A and 11A and FIGS. 10B and 11B, suppose that the reflected light beam L3 is incident on a position that is deviated in the −rad direction due to lens shift. The imaginary center L3Q of the reflected light beam L3 is off the imaginary center line 51X of the light beam splitting section 51 in the −rad direction.

In this case, as compared with the case of FIG. 10A, in contrast to the case of FIG. 11A, the area of the reflected light beam L3F2 decreases, and the area of the reflected light beam L3F1 increases. Thus, among the portions of the spot T4PF, the area of the spot T4PF2 decreases, and the area of the spot T4PF1 increases. Therefore, the value of the detection signal UK2 decreases, and the value of the detection signal UL2 generated by the photodetection device 52L2 increases.

In this case, among the portions of the reflected light beam L3, the cross-sectional area of the reflected light beam L3E4 decreases, and the cross-sectional area of the reflected light beam L3E3 increases. Thus, among the portions of the spot T4PE, the area of the spot T4PE4 decreases, and the area of the spot T4PE3 increases. Therefore, the value of the detection signal UK1 generated by the photodetection device 52K1 decreases, and the value of the detection signal UL1 generated by the photodetection device 52L1 increases.

Thus, the photodetection device group 52A changes the values of the detection signals UK1, UK2, UL1, and UL2 in accordance with the amount of lens shift. Likewise, the photodetection device group 52B changes the values of the detection signals UM1, UM2, UN1, and UN2 in accordance with the amount of lens shift.

The signal processor 13 calculates lens shift signals SLS1 and SLS2 on the basis of the detection signal U using equations (3) and (4).

$$SLS1 = (UK1 - UL1) + (UM1 - UN1) \quad (3)$$

$$SLS2 = (UK2 - UL2) + (UM2 - UN2) \quad (4)$$

The lens shift signal SLS1 represents the amount of lens shift derived from the region 51E of the light beam splitting section 51, that is, the amount of lens shift obtained on the basis of the reflected light beams L4PE and L4ME. The lens shift signal SLS1 practically corresponds to the difference between the areas of the spots T4PE4 and T4PE3.

The lens shift signal SLS2 represents the amount of lens shift derived from the region 51F of the light beam splitting section 51, that is, the amount of lens shift obtained on the basis of the reflected light beams L4PF and L4MF. The lens shift signal SLS2 practically corresponds to the difference between the areas of the spots T4PF2 and T4PF1.

Moreover, the signal processor 13 calculates a lens shift signal SLS by adding the shift signals SLS1 and SLS2 using equation (5).

$$SLS = SLS1 + SLS2 \quad (5)$$

Thus, the signal processor 13 can calculate the lens shift signal SLS in accordance with the amount of lens shift of the objective lens 9B.

By substituting equations (2), (3), and (4) into equation (5), equation (6) is obtained.

$$\begin{aligned} SLS &= \{(UK1 + UK2) + (UM1 + UM2)\} - \\ &\quad \{(UL1 + UL2) + (UN1 + UN2)\} \\ &= (UK + UM) - (UL + UN) \end{aligned} \quad (6)$$

If the intermediate values UK, UL, UM, and UM have been calculated in advance using equations (2), the signal processor 13 can calculate the focus error signal SFE and the lens shift signal SLS using the intermediate values.

1-4-5. Effect of Deviation of Mounting Position of Optical Component

FIG. 6B illustrates the spot T4 formed on an ideal optical integrated device 21 in which the amount of lens shift is zero, the amount of defocus of the light beam L1 is zero, and various optical components are disposed without positional deviations.

Suppose that the position of the photodetector 44 in the optical integrated device 21 (FIG. 4) is deviated from a normal mounting position. For example, as illustrated in FIG. 13 corresponding to FIG. 6B, suppose that the spot T4 is incident on the photodetection section 52 at a position deviated in the +tan direction.

At this time, the imaginary centers T4PQ and T4MQ are deviated from the imaginary center line 52Y of the photodetection device groups 52A and 52B in the +tan direction.

Figure 13:
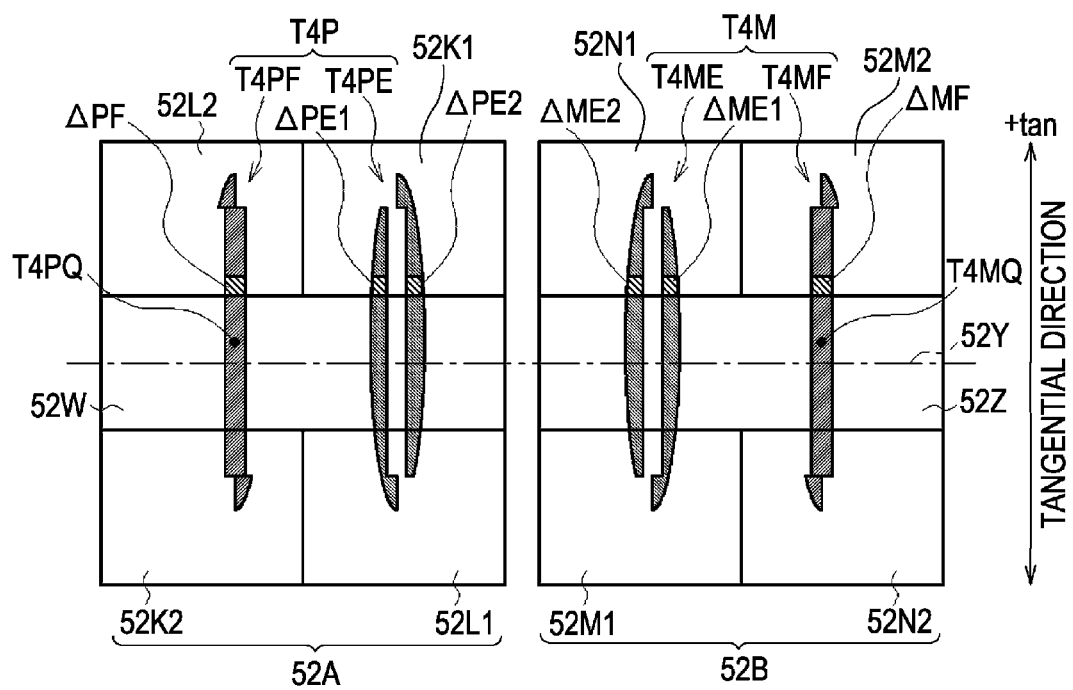
FIG. 13 is a diagram illustrating the shapes of spots formed on the photodetection section.

FIG. 13 illustrates a state in which the amount of lens shift of the objective lens 9B is zero and the amount of defocus of the light beam L1 is zero (that is, an in focus state).

In this case, as compared with an ideal state illustrated in FIG. 6B, the areas of the spots T4PE and T4ME on the photodetection devices 52K1 and 52N1 increase. Therefore, the amounts of detected light increase, and the values of the detection signals UK1 and UN1 increase.

The changes in the irradiated areas of the photodetection devices 52K1 and 52N1 can be represented, for example, as incremental portions $\Delta PE1$, $\Delta PE2$, $\Delta ME1$, and $\Delta ME2$ (FIG. 13).

The areas of the spots T4PE and T4ME are approximately equal. The sum of the areas of the incremental portions $\Delta PE1$ and $\Delta PE2$ is approximately equal to the sum of the areas of the incremental portions $\Delta ME1$ and $\Delta ME2$. Therefore, the increments in the detection signals UK1 and UN1 are approximately equal.

On the other hand, the areas of the spots T4PE and T4ME on the photodetection devices 52L1 and 52M1 decrease. Thus, the amounts of detected light and the values of the detection signals UL1 and UM1 decrease. The decrements in the detection signals UL1 and UM1 are approximately equal.

Therefore, when the signal processor 13 calculates the lens shift signal SLS1 using equation (3), the increments in the detection signals UK1 and UN1 cancel each other out, and the decrements in the detection signals UL1 and UM1 cancel each other out.

As compared with the ideal state illustrated in FIG. 6B, the areas of the spots T4PF and T4MF on the photodetection device 52L2 and 52M2 increase. Therefore, the amounts of detected light and the values of the detection signals UL2 and UM2 increase.

The changes in the irradiated areas of the photodetection devices 52L2 and 52M2 can be represented, for example, as incremental portions $\Delta PF$ and $\Delta MF$ (FIG. 13).

The areas of the spots T4PF and T4MF are approximately equal. The areas of the incremental portions $\Delta PF$ and $\Delta MF$ are approximately equal. Therefore, the increments in the detection signals UL2 and UM2 are approximately equal.

On the other hand, the areas of the spots T4PF and T4ME on the photodetection devices 52K2 and 52N2 decrease. Therefore, the amounts of detected light and the values of the detection signals UK2 and UN2 decrease. The decrements in the detection signals UK2 and UN2 are approximately equal.

Therefore, when the signal processor 13 calculates the lens shift signal SLS2 using equation (4), the increments in the detection signals UL2 and UM2 cancel each other out, and the decrements in the detection signals UK2 and UN2 cancel each other out.

Since the increments and the decrements respectively cancel each other out in equations (3) and (4), the signal processor 13 can generate, using equation (5), a lens shift signal SLS equivalent to the one in the ideal state illustrated in FIG. 6B.

That is, even if the position of the spot T4 is deviated from the ideal state in the tangential direction in the first optical system 21A, the optical disc apparatus 1 can accurately calculate the lens shift signal SLS, because the increments and the decrements in the detection signal U respectively cancel each other out.

Figure 14:
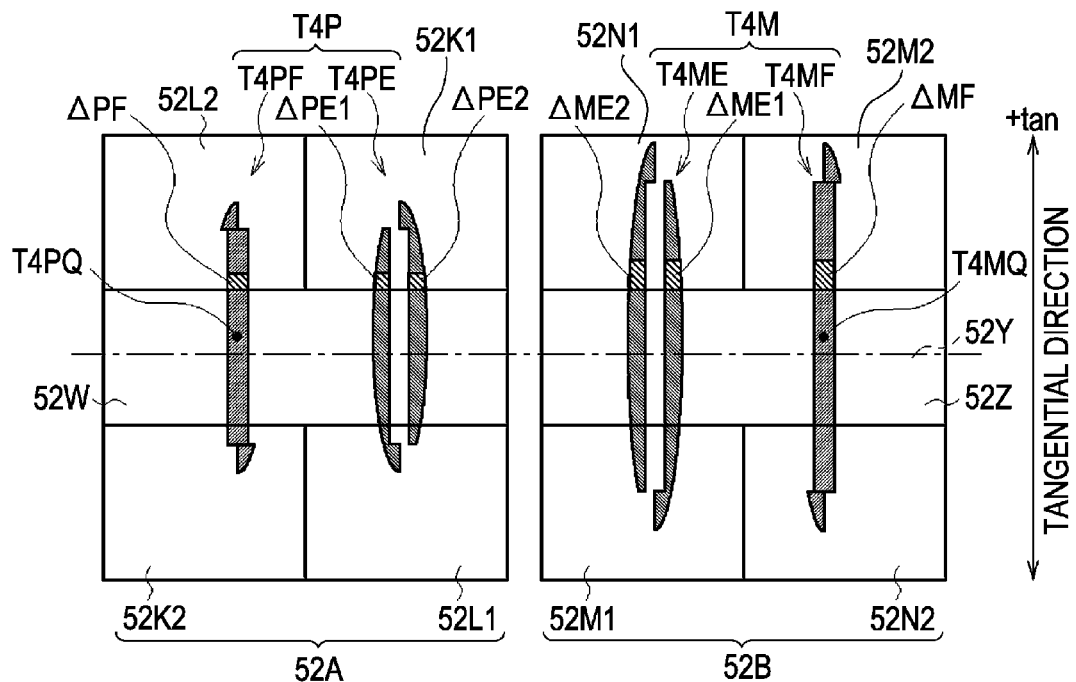
FIG. 14 is a diagram illustrating the shapes of spots formed on the photodetection section.

FIG. 14, which corresponds to FIG. 13, illustrates a state in which the spot T4 is incident on the photodetection section 52 at a position deviated in the +tan direction and the light beam L1 is defocused. In the state illustrated in FIG. 14, the amount of lens shift of the objective lens 9B is zero.

As in the case of FIG. 13, the imaginary centers T4PQ and T4MQ are deviated from the imaginary center line 52Y of the photodetection device groups 52A and 52B in the +tan direction.

In this case, as compared with the ideal state illustrated in FIG. 6B, the areas of the spots T4PE and T4ME on the photodetection devices 52K1 and 52N1 change due to the defocused state of the light beam L1. Since the amounts of detected light change, the photodetection devices 52K1 and 52N1 change the values of the detection signals UK1 and UN1.

The changes in the irradiated areas of the photodetection devices 52K1 and 52N1 can be represented, for example, as incremental portions ΔPE1, ΔPE2, ΔME1, and ΔME2 (FIG. 14).

Likewise, the photodetection devices 52L1 and 52M1 change the values of the detection signals UL1 and UM1.

At this time, the areas of the spots T4PE and T4ME are not equal. Therefore, the sum of the areas of the incremental portions ΔPE1 and ΔPE2 is not equal to the sum of the areas of the incremental portions ΔME1 and ΔME2.

Therefore, the amounts of changes in the detection signals UK1 and UN1 from a state in which the light beam L1 is in focus (FIG. 13) are not equal, and the amounts of changes in the detection signals UL1 and UM1 are not equal. As a result, in contrast to the case illustrated in FIG. 13, it is difficult for the signal processor 13 to make the amounts of changes in the detection signals UL1 and UM1 cancel each other out, and to make the amounts of changes in the detection signals UK1 and UN1 cancel each other out, by calculation using equation (3).

The areas of the spots T4PF and T4MF on the photodetection devices 52L2 and 52M2 change due to the defocused state of the light beam L1. Therefore, the amounts of detected light change, and the photodetection devices 52L2 and 52M2 change the values of the detection signals UL2 and UM2.

The changes in the irradiated areas of the photodetection devices 52L2 and 52M2 can be represented, for example, as incremental portions ΔPF and ΔMF (FIG. 14).

Likewise, the photodetection devices 52K2 and 52N2 change the values of the detection signals UL2 and UM2.

At this time, since the areas of the spots T4PF and T4MF are not equal, the areas of the incremental portions ΔPF and ΔMF are not equal.

Therefore, the amounts of changes in the detection signals UL2 and UM2 from a state in which the light beam L1 is in focus (FIG. 13) are not equal, and the amounts of changes in the detection signals UK2 and UN2 are not equal. As a result, it is difficult for the signal processor 13 to make the amounts of changes in the detection signal UL2 and UM2 cancel each other out, and to make the amounts of changes in the detection signals UK2 and UN2 cancel each other out, by calculation using equation (4).

As described above, the light beam splitting section 51 is designed in such a manner that the area of the region 51F3 is approximately equal to the sum of the areas of the regions 51E1 and 51E2 on which the reflected light beam L3 is incident.

This implies that, in FIG. 14, the sum of the areas of the incremental portions ΔPE1 and ΔPE2 is approximately equal to the area of the incremental portion ΔPF, and that the sum of the areas of the incremental portions ΔME1 and ΔME2 is approximately equal to the area of the incremental portion ΔMF.

Therefore, the amount of change in the detection signal UK1 generated by the photodetection device 52K1 is approximately equal to the amount of change in the detection signal UL2 generated by the photodetection device 52L2. Moreover, the amount of change in the detection signal UL1 generated by the photodetection device 52L1 is approximately equal to the amount of change in the detection signal UK2 generated by the photodetection device 52K2.

Likewise, the amount of change in the detection signal UM1 generated by the photodetection device 52M1 is approximately equal to the amount of change in the detection signal UN2 generated by the photodetection device 52N2. Moreover, the amount of change in the detection signal UN1 generated by the photodetection device 52N1 is approximately equal to the amount of change in the detection signal UM2 generated by the photodetection device 52M2.

By substituting equations (3) and (4) into equation (5), the lens shift signal SLS can be represented by equation (7).

$$SLS=(UK1-UL2)+(UM1-UN2)+(UK2-UL1)+(UM2-UN1) \quad (7)$$

As can be seen from the first half of equation (7), when calculating the lens shift signal SLS, the amounts of changes in the detection signals UK1 and UL2 cancel each other out, and the amounts of changes in the detection signals UK2 and UL1 cancel each other out.

As can be seen from the second half of equation (7), when calculating the lens shift signal SLS, the amounts of changes in the detection signals UM1 and UN2 cancel each other out, and the amounts of changes in the detection signals UM2 and UN1 cancel each other out.

Thus, using equation (7), (5), or (6), which are equivalent to each other, the signal processor 13 can generate a lens shift signal SLS similar to the one in the ideal state illustrated in FIG. 6B.

That is, with the optical disc apparatus 1, even if the spot T4 is formed at a position deviated in the tangential direction and the areas of the spots T4P and T4M are not equal in the first optical system 21A, the signal processor 13 can make the increments and the decrements in the detection signal U respectively cancel each other out.

Therefore, even if the mounting positions of optical components in the first optical system 21A are deviated in the tangential direction and the light beam L1 is defocused, the optical disc apparatus 1 can precisely calculate the lens shift signal SLS.

Thus, the first optical system 21A can generate the detection signal U including components among which positional deviations in the tangential direction cancel each other out, since each of the photodetection devices of the photodetection section 52 detects a portion of the spot T4. On the basis of the detection signals U, the signal processor 13 can calculate a high-precision focus error signal SFE and a lens shift signal SLS from which the effect due to deviation of the mounting positions of optical components are eliminated.

1-5. Generation of Detection Signal by Second Optical System

As described above, in the optical integrated device 21, a portion of the reflected light beam L2 is transmitted by the reflection coating 47B of the prism assembly 47 and becomes the reflected light beam L5, and the reflected light beam L5 is reflected by the reflection coating 47C. Moreover, in the optical integrated device 21, the reflected light beam L5 is split into a plurality of portions by the light beam splitting section 53 and becomes the reflected light beam L6, and the reflected light beam L6 is detected by the photodetection section 54 of the photodetector 44. Hereinafter, an optical system that includes the reflection coating 47B and 47C, the light beam splitting section 53, and the photodetection section 54 is referred to as a second optical system 21B.

Figure 15:
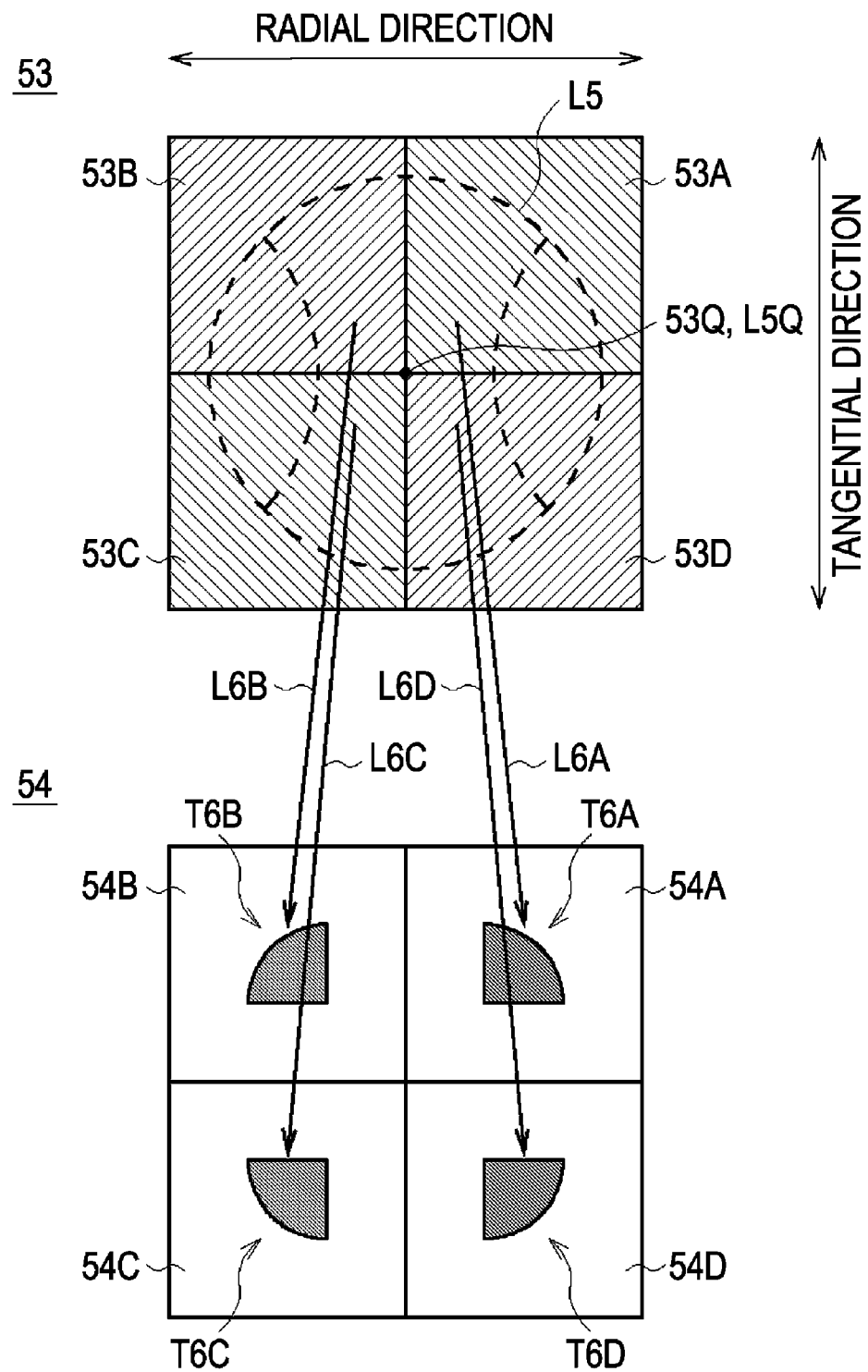
FIG. 15 is a diagram of a light beam splitting section and a photodetection section according to the first embodiment.

As illustrated in FIG. 15, the light beam splitting section 53 of the second optical system 21B is generally square-shaped in top view. The light beam splitting section 53 is divided into four regions 53A, 53B, 53C, and 53D that are arranged in a grid pattern. The second optical system 21B is designed in such a manner that an imaginary center L5Q of the reflected light beam L5 coincides with a division center 53Q of the light beam splitting section 53.

A blazed diffraction grating is formed on each of the regions 53A to 53D. The diffraction gratings diffract portions of the reflected light beam L5 in directions away from the division center 53Q, thereby changing the reflected light beam L5 into four light beams L6A, L6B, L6C, and L6D.

In the photodetection section 54 of the photodetector 44, photodetection devices 54A, 54B, 54C, and 54D, each being substantially square-shaped, are arranged in a grid pattern. The photodetection devices 54A to 54D correspond to the regions 53A to 53D of the light beam splitting section 53, respectively.

The light beams L6A, L6B, L6C, and L6D become separated from one another with increasing distance from the light beam splitting section 53. The light beams L6A, L6B, L6C, and L6D are incident on the photodetection devices 54A, 54B, 54C, and 54D of the photodetection section 54 and form spots T6A, T6B, T6C, and T6D, respectively.

Each of the photodetection devices 54A, 54B, 54C, and 54D receives a portion of the reflected light beams L6A, L6B, L6C, and L6D, respectively, and generates detection signals UA, UB, UC, and UD in accordance with the amounts of received light.

As in the case of the first optical system 21A, the photodetector 44 (FIG. 4) amplifies the detection signals U using an amplifier circuit (not shown), and outputs the detection signal U to the signal processor 13 (FIG. 2) through the terminals 41T disposed on the lower surface of the support substrate 41.

The signal processor 13 calculates the tracking error signal STE by a so-called push-pull method using equation (8).

$$STE=\{(UA+UD)-(UB+UC)\}-k\{(UK+UM)-(UL+UN)\} \quad (8)$$

The intermediate values UK, UL, UM, and UN are calculated on the basis of the detection signal U using equations (2). The coefficient k is a predetermined coefficient.

As can be seen by comparing equation (8) with equation (6), the second half of equation (8) is equal to the lens shift signal SLS multiplied by the coefficient k. The first half of equation (8) is a calculation using detection results obtained by the photodetection devices 54A to 54D. Thus, the first half includes all the effects of lens shift of the objective lens 9B.

That is, using equation (8), a lens shift component is subtracted from the push-pull signal including the lens shift component, so that a tracking error signal STE excluding the effect of lens shift is calculated.

The signal processor 13 calculates the reproduction RF signal SRF using equation (9).

$$SRF=UA+UB+UC+UD \quad (9)$$

Thus, the signal processor 13 generates the tracking error signal STE using the detection signals UA to UD and the lens shift signal SLS, and generates a reproduction RF signal SRF on the basis of the detection signals UA to UD.

The second optical system can generate the detection signals UA to UD if the amounts of portions of the reflected light beam L5 that respectively pass through the regions 53A, 53B, 53C, and 53D of the light beam splitting section 53 can be independently detected. Therefore, the light beam splitting section 53 may be omitted from the second optical system, and the photodetection devices 54A to 54D of the photodetection section 54 may be directly irradiated with the reflected light beam L5.

However, the optical axis of the reflected light beam L5 may be deviated from the division center of the photodetection section 54 due to the deviation of the mounting positions of optical components. In such a case, the amounts of portions of the reflected light beam L5 that are respectively incident on the photodetection devices 54A to 54D of the photodetection section 54 change, whereby the precision of the detection signals UA to UD decreases.

In particular, it is difficult to adjust the mounting position of the photodetection section 54 in the optical integrated device 21, because the photodetection sections 54 and 52 are both formed on the photodetector 44 and because the photodetector 44 is fixed to the support substrate 41 together with other components. Thus, if the precision of the mounting position of another optical component has a priority in the optical integrated device 21, the precision of the detection signals UA to UD in the second optical system is not improved.

Therefore, in the optical integrated device 21, the light beam splitting section 53 is provided so as to split the reflected light beam L5 at appropriate positions beforehand, so that the proportions of the reflected light beams L6A to L6D after being split are optimized and so that the reflected light beams L6A to L6D travel in different directions away from each other. As a result, even if the mounting position of the photodetector 44 is deviated, the optical integrated device 21 can independently detect the amounts of reflected light beams L6A to L6D after being split using the photodetection devices 54A to 54D, and can generate the detection signals UA to UD with high precision.

Thus, the second optical system 21B can generate the detection signals UA to UD, with which the tracking error signal STE and the reproduction RF signal SRF can be appropriately calculated.

1-6. Operation and Advantage

As described above, in the optical pickup 6 of the optical disc apparatus 1, the first optical system 21A of the optical integrated device 21 includes the light beam splitting section 51 having the regions 51F1, 51F2, and 51F3, and the region 51F3 connects the regions 51F1 and 51F2 in the tangential direction.

The regions 51F and 51E of the light beam splitting section 51 diffract the reflected light beam L3 at different angles so as to generate the reflected light beams L4PF, L4PE, L4MF, and L4ME that travel in different directions.

Subsequently, the reflected light beams L4PF, L4PE, L4MF, and L4ME respectively form the spots T4PF, T4PE, T4MF, and T4ME on the photodetection device groups 52A and 52B of the photodetection section 52. Each of the photodetection devices of the photodetection device groups 52A and 52B generates a detection signal U in accordance with the amount of received light, and outputs the detection signal U to the signal processor 13.

Using the detection signal U, the signal processor 13 generates the focus error signal SFE using equation (1), and generates the lens shift signal SLS using equations (3) to (5).

Figure 16A:
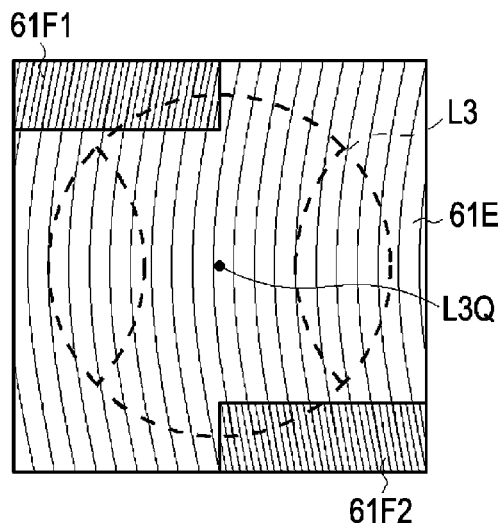
FIGS. 16A and 16B are diagrams of a light beam splitting section and a photodetection section of an imaginary optical system.
Figure 16B:
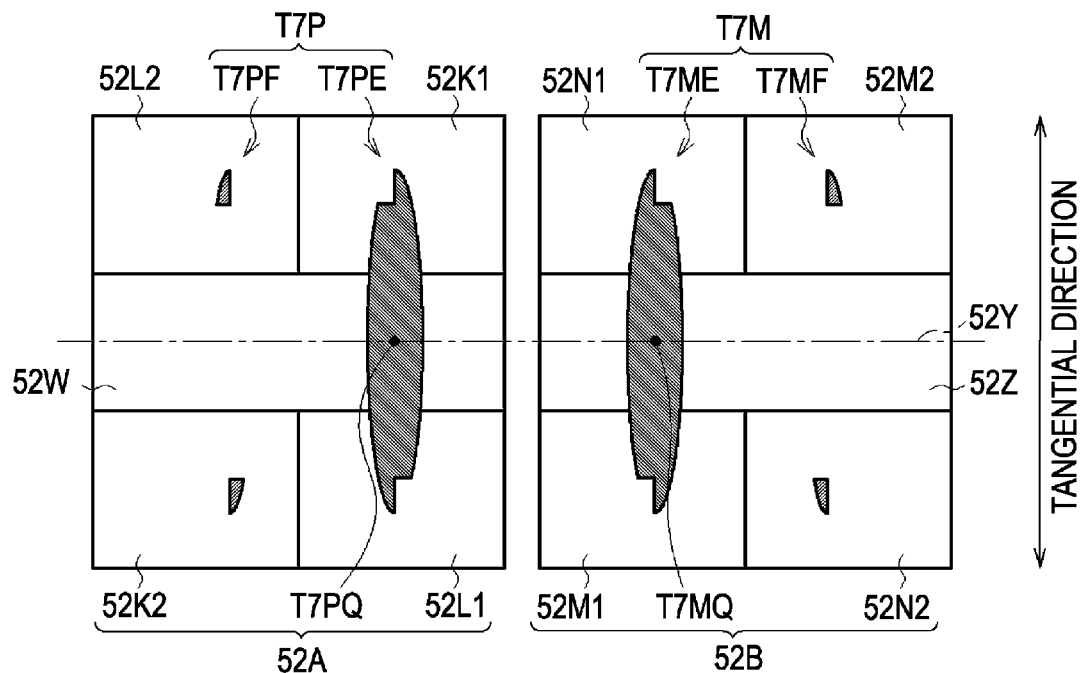

Suppose that an imaginary optical system 60A is contrasted with the first optical system 21A of the optical integrated device 21. As illustrated in FIGS. 16A and 16B, the optical system 60A includes, instead of the light beam splitting section 51 of the first optical system 21A, a light beam splitting section 61 similar to the diffraction grating described in Japanese Unexamined Patent Application Publication No. 2007-265595.

As with the light beam splitting section 51, the light beam splitting section 61 includes regions 61F1 and 61F2 that are similar to the regions 51F1 and 51F2. However, the light beam splitting section 61 does not have a region corresponding to the region 51F3. Instead, the light beam splitting section 61 has a region 61E similar to a union of the regions 51E1, 51E2, and 51F3.

On the regions 61F1 and 61F2, diffraction gratings having a grating pitch similar to that of the diffraction gratings on the regions 51F1 to 51F3 are formed. The regions 61F1 and 61F2 diffract portions of the reflected light beam L3 at comparatively large angles in the radial direction. Thus, a reflected light beam L7PF composed of +1 order light and a reflected light beam L7MF composed of −1 order light are generated.

On the region 61E, a diffraction grating having a grating pitch similar to that of the diffraction gratings on the regions 51E1 and 51E2 are formed. The region 61E diffracts a portion of the reflected light beam L3 at a comparatively small diffraction angle in the radial direction. Thus, a reflected light beam L7PE composed of +1 order light and a reflected light beam L7ME composed of −1 order light are generated.

Accordingly, as illustrated in FIG. 16B, the photodetection device group 52A of the photodetection section 52 is irradiated with the reflected light beams L7PF and L7PE, so that spots T7PF and T7PE (hereinafter collectively referred to as a spot T7P) are formed. The photodetection device group 52B is irradiated with reflected light beams L7MF and L7ME, so that spots T7MF and T7ME (hereinafter collectively referred to as a spot T7M) are formed.

FIG. 16B illustrates an ideal state in which the amount of lens shift of the objective lens 9B is zero, the light beam L1 is in focus, and the mounting positions of optical components are not deviated.

In FIG. 16B, as compared with FIG. 6B, the spots T7PF and T7MF do not include portions corresponding to the region 51F3 of the light beam splitting section 51. Instead, the spots T7PE and T7ME include portions corresponding to the region 51F3, thereby having integral shapes.

The photodetection devices of the photodetection section 52 receive portions of the spots T7PF, T7PE, T7MF, and T7ME (hereinafter collectively referred to as a spot T7). As with the first optical system 21A, each of the photodetection devices generates a detection signal U in accordance with the amount of received light and outputs the detection signal U to the signal processor 13.

As with the first optical system 21A, the signal processor 13 of the imaginary optical system 60A can calculate the focus error signal SFE on the basis of the detection signal U using equation (1) and can calculate the lens shift signal SLS using equations (3) to (5).

Figure 17:
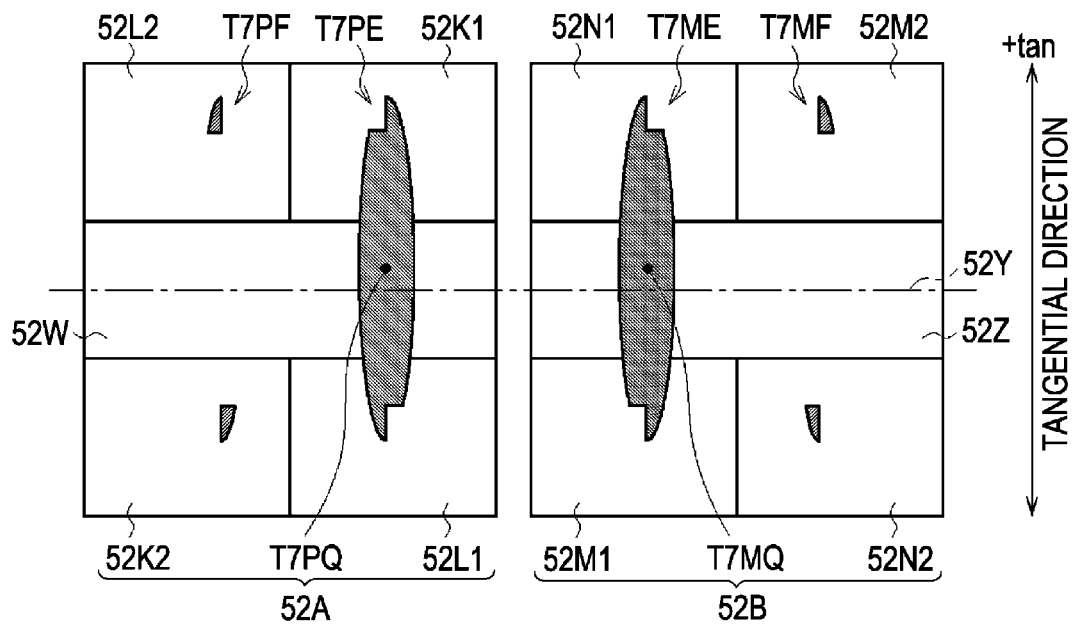
FIG. 17 is a diagram illustrating the shapes of spots formed on the photodetection section of the imaginary optical system.

Next, suppose that the mounting positions of optical components are deviated in the optical system 60A, and the spot T7 is formed on the photodetection section 52 at a position deviated in the +tan direction, as illustrated in FIG. 17 corresponding to FIG. 13.

In this case, as compared with the ideal state illustrated in FIG. 16B, the areas of the spots T7PE and T7ME on the photodetection devices 52K1 and 52N1 increase, whereby the values of the detection signals UK1 and UN1 increase. Since the areas of the spots T7PE and T7ME are approximately equal, the increments in the detection signals UK1 and UN1 are approximately equal.

On the other hand, the areas of the spots T7PE and T7ME on the photodetection devices 52L1 and 52M1 increase, whereby the values of the detection signals UL1 and UM1 increase. The decrements in the detection signals UL1 and UM1 are approximately equal.

Therefore, when the signal processor 13 calculates the lens shift signal SLS1 using equation (3), the increments in the detection signals UK1 and UN1 and the decrements in the detection signals UL1 and UM1 respectively cancel each other out.

As compared with the ideal state in FIG. 16B, since the areas of the spots T7PF and T7MF on the photodetection devices 52L2 and 52M2 do not change, the photodetection devices 52L2 and 52M2 do not change the values of the detection signal UL2 and UM2. Likewise, since the areas of the spots T7PF and T7MF on the photodetection devices 52K2 and 52N2 do not change, the photodetection devices 52K2 and 52N2 do not change the values of the detection signals UK2 and UN2.

Therefore, the signal processor 13 can accurately calculate the lens shift signal SLS2 using equation (4).

That is, as long as the light beam L1 is in focus, the signal processor 13 can appropriately calculate the lens shift signal SLS using equation (5) by using the detection signal U supplied from the optical system 60A, even if the mounting positions of optical components are deviated.

Figure 18:
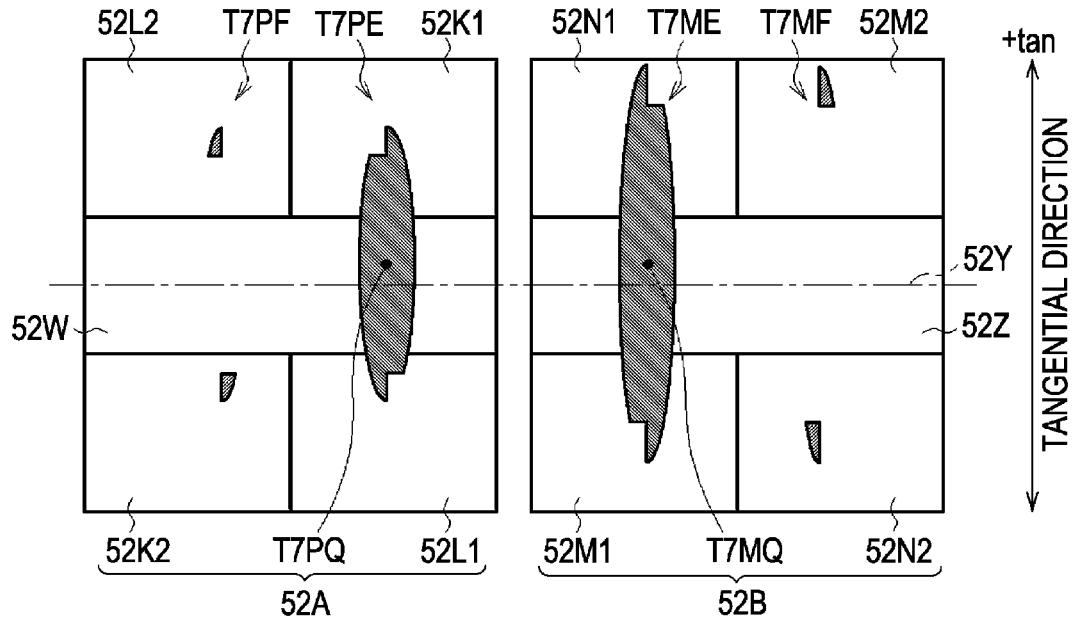
FIG. 18 is a diagram illustrating the shapes of spots formed on the photodetection section of the imaginary optical system.

Suppose that, as illustrated in FIG. 18 corresponding to FIG. 14, in the imaginary optical system 60A, the spot T7 is incident on the photodetection section 52 at a position deviated in the +tan direction and the light beam L1 is out of focus. FIG. 18 illustrates a state in which the amount of lens shift of the objective lens 9B is zero.

At this time, as in the case of FIG. 17, the imaginary centers T7PQ and T7MQ are deviated in the +tan direction from the imaginary center line 52Y of the photodetection device groups 52A and 52B in the tangential direction.

In this case, the areas of spots T4PF and T4MF on the photodetection devices 52L2 and 52M2 slightly change. However, since the amounts of light on the spots changes only negligibly, the photodetection devices 52L2 and 52M2 change the values of the detection signals UL2 and UM2 only negligibly. Likewise, the photodetection devices 52K2 and 52N2 change the values of the detection signal UL2 and UM2 only negligibly.

Therefore, the signal processor 13 can accurately calculate the lens shift signal SLS2 using equation (4).

On the other hand, as compared with the ideal state illustrated in FIG. 16B, the areas of the spots T7PE and T7ME on the photodetection devices 52K1 and 52N1 change. Therefore, the amounts of detected light change, and the photodetection devices 52K1 and 52N1 change the values of the detection signals UK1 and UN1. Likewise, the photodetection device 52L1 and 52M1 change the values of the detection signals UL1 and UM1.

At this time, since the areas of the spots T7PE and T7ME are not equal, the amounts of changes in the detection signals UK1 and UN1 are not equal and the amounts of changes in the detection signals UL1 and UM1 are not equal. Therefore, it is difficult for the signal processor 13 to make the amounts of changes in the detection signals UK1 and UN1 cancel each other out, and to make the amounts of changes in the detection signals UL1 and UM1 cancel each other out, by calculation using equation (3).

As a result, it is difficult for the signal processor 13, even by using equation (3) and equation (4) in combination, to make the amounts of changes in the detection signals UK1 and UN1 cancel each other out, and to make the amounts of changes in the detection signals UL1 and UM1 cancel each other out. Therefore, it is difficult for the signal processor 13 to accurately calculate the lens shift signal SLS.

That is, it is difficult for the optical system 60A to generate the detection signal U that enables the signal processor 13 to accurately calculate the lens shift signal SLS when the light beam L1 is defocused in a state in which the mounting positions of optical components are deviated.

In contrast, in the first optical system 21A (FIG. 4), the light beam splitting section 51 includes the region 51F3. Moreover, in the spot T4PF (FIG. 6), the spot T4PF3 connects the spot T4PF1 and the spot T4PF2 in the tangential direction. The spot T4PF has a shape in which the spot T4PF3 is added to spot T7PF illustrated in FIG. 16.

With the first optical system 21A, if the spot T4 is incident on the photodetection section 52 at a position deviated in the +tan direction (FIG. 13), the increments in the detection signals UK1 and UN1 are approximately equal, and the decrements in the detection signals UL1 and UM1 are approximately equal. Therefore, when calculating the lens shift signal SLS1 using equation (3), the signal processor 13 can make the increments and the decrements respectively cancel each other out.

In this case, the increments in the detection signals UL2 and UM2 are approximately equal, and the decrements in the detection signals UK2 and UN2 are approximately equal. Therefore, when calculating the lens shift signal SLS2 equation (4), the signal processor 13 can make the increments and the decrements respectively cancel each other out.

Therefore, by performing calculation using equation (5) on the basis of the detection signal U generated by the first optical system 21A, the signal processor 13 can appropriately calculate the lens shift signal SLS from which the effect of deviation of the mounting positions of optical components is eliminated.

Moreover, the first optical system 21A is designed in such a manner that the area of the region 51F3 of the light beam splitting section 51 is approximately equal to the sum of the areas of the regions 51E1 and 51E2 on which the reflected light beam L3 is incident (FIG. 6A).

Therefore, in the first optical system 21A, even if the spot T4 is incident on the photodetection section 52 at a position deviated in the +tan direction and the light beam L1 is defocused (FIG. 14), the sum of the areas of the incremental portions ΔPE1 and ΔPE2 is approximately equal to the area of the incremental portion ΔPF. Therefore, in the first optical system 21A, the amounts of changes in the detection signals UK1 and UL2 are approximately equal. Thus, when calculating the lens shift signal SLS using equation (7), the signal processor 13 can make the amounts of changes cancel each other out.

Likewise, in the first optical system 21A, the amounts of changes in the detection signals UL1 and UK2, the amounts of changes in the detection signals UM1 and UN2, and the amounts of changes in the detection signals UN1 and UM2 are approximately equal, respectively. Thus, when calculating the lens shift signal SLS using equation (7), the signal processor 13 can make the amounts of changes respectively cancel each other out.

That is, by performing calculation using equation (7) on the basis of the detection signal U supplied from the first optical system 21A, the signal processor 13 can appropriately calculate the lens shift signal SLS from which the effect of the deviation of the mounting positions of optical components and the effect of the defocused state of the light beam L1 are eliminated.

In other words, the first optical system 21A of the optical integrated device 21 can generate the detection signal U that enables the signal processor 13 to accurately calculate the lens shift signal SLS, even if the mounting positions of optical components are deviated and the light beam L1 is defocused.

In the first optical system 21A, the mounting positions of optical components may be deviated when, for example, optical components such as the photodetector 44 and the compound lens 46 are deviated from ideal positions.

The lengths of the spots T4P and T4M in the tangential direction may become different from each other due to causes such as, besides the defocused state of the light beam L1, spherical aberration of the light beam L1.

However, even if the spot T4 is formed on the photodetection section 52 at a position deviated in the tangential direction and the areas of the spots T4P and T4M are not equal for whatever causes, the first optical system 21A can generate the detection signal U that enables precise calculation of the lens shift signal SLS.

Moreover, the signal processor 13 can appropriately calculate the focus error signal SFE using equation (1) (FIGS. 8A to 9C) on the basis of the detection signal U generated by the first optical system 21A.

It is not necessary that the signal processor 13 perform special calculation, since the light beam splitting section 51 includes the region 51F3. The signal processor 13 can generate the focus error signal SFE by performing calculation similar to that in the case without the region 51F3.

As described above, in the first optical system 21A of the optical integrated device 21, the light beam splitting section 51 includes the regions 51F1 and 51F2. The regions 51F1 and 51F2 are disposed at ends of the light beam splitting section 51 in the tangential direction and on opposite sides of the light beam splitting section 51 in the radial direction, and the region 51F3 connects the regions 51F1 and 51F2 in the tangential direction. Thus, in the first optical system 21A, even if the spot T4 is formed at a position deviated in the tangential direction and the areas of the spots T4P and T4M are not equal, the amounts of changes in the detection signals UK1 and UL2, the amounts of changes in the detection signals UL1 and UK2, the amounts of changes in the detection signals UM1 and UN2, and the amounts of changes in the detection signals UN1 and UM2 are approximately equal, respectively. Therefore, by performing calculation in accordance equation (7) on the basis of the detection signal U generated by the first optical system 21A, the signal processor 13 can calculate, with high precision, the lens shift signal SLS from which the effect of deviation of the mounting positions of the optical components and the effect of the defocused state of the light beam L1 are eliminated.

2. Second Embodiment 2-1. Structures of Optical Disc Apparatus and Optical Pickup An optical disc apparatus 101 (FIG. 1) according to a second embodiment differs from the optical disc apparatus 1 according to the first embodiment in that the optical disc apparatus 101 includes an optical pickup 106 instead of the optical pickup 6. Other components of the optical disc apparatus 101 are similar to those of the optical disc apparatus 1, and description thereof is omitted.

Figure 19:
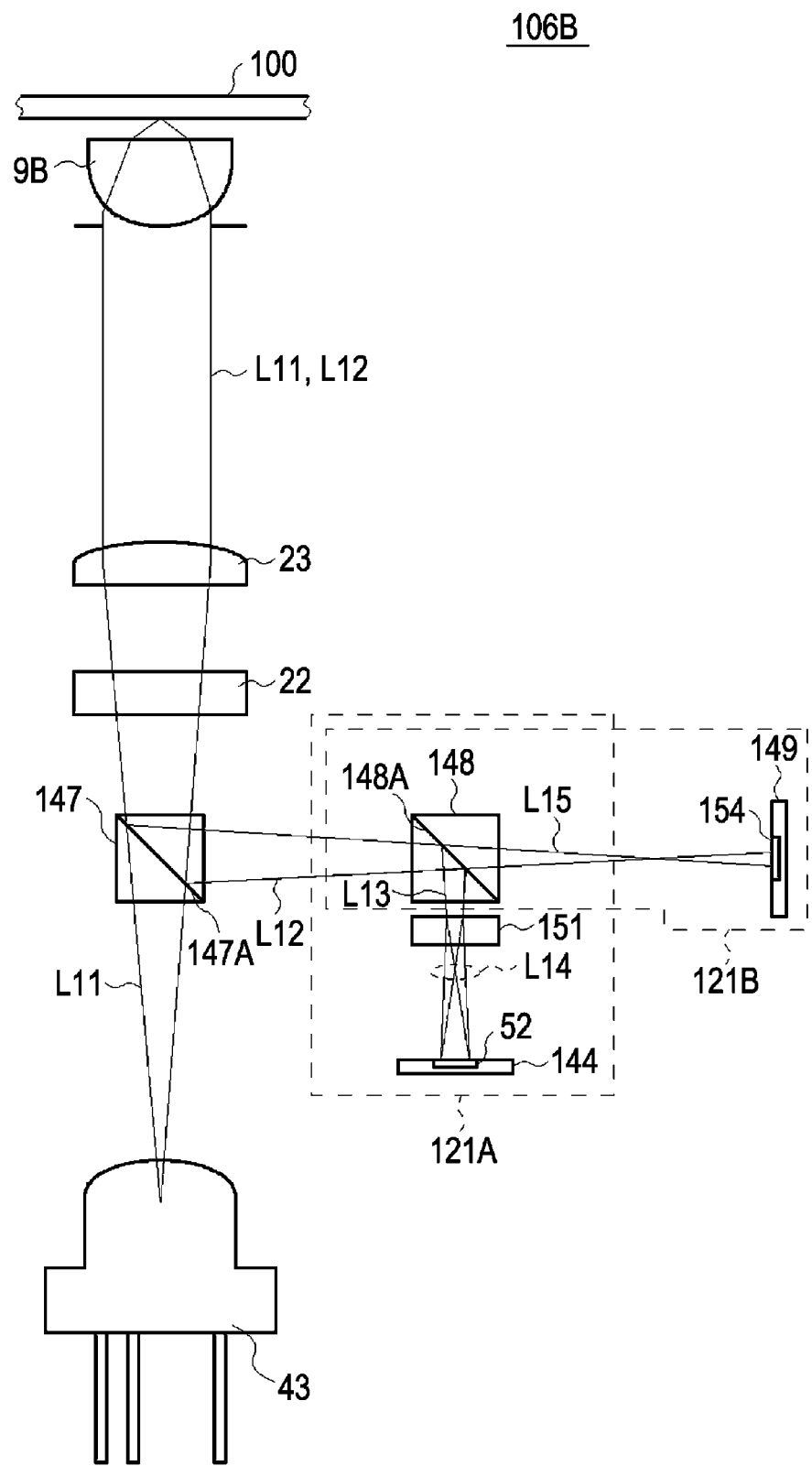
FIG. 19 is a diagram of an optical pickup according to a second embodiment.

The optical pickup 106 includes a BD optical system 106B (FIG. 19), which corresponds to the BD optical system 6B (FIG. 4) of the optical pickup 6, and a DVD/CD optical system 106D (not shown), which corresponds to the DVD/CD optical system 6D of the optical pickup 6.

The BD optical system 106B (FIG. 19) significantly differs from the BD optical system 6B (FIG. 4) in that the BD optical system 106B includes a plurality of optical components instead of the optical integrated device 21. However, other optical components, such as the objective lens 9B, are similar.

As with the BD optical system 6B, in the BD optical system 106B, the laser diode 43 emits the light beam L11, which is composed of divergent light at a wavelength of 405 nm, and the light beam L11 enters a beam splitter 147.

The beam splitter 147 includes a reflection coating 147A that has optical properties similar to those of the reflection coating 47A of the prism assembly 47 (FIG. 4). The reflection coating 147A transmits a p-polarized component of the light beam L11, and the p-polarized component of the light beam L11 enters the quarter wavelength plate 22.

The reflection coating 147A of the beam splitter 147 reflects a s-polarized component of the light beam L11, and the s-polarized component of the light beam L11 enters a photodetection section for adjusting light intensity (not shown). As with the optical disc apparatus 1, the optical disc apparatus 101 performs feedback control of the intensity of the light beam L11 on the basis of a detection result obtained by the photodetection section for adjusting light intensity.

The light beam L11 is converted to left-hand circularly polarized light by the quarter wavelength plate 22, converted from divergent light to parallel light by the collimator lens 23, and focused onto the optical disc 100 by the objective lens 9B. At this time, the light beam L11 is reflected by a recording surface of the optical disc 100, and becomes a reflected light beam L12, which is composed of right-hand circularly polarized light and travels in a direction opposite to that of the light beam L11.

The reflected light beam L12 is converted to parallel light by the objective lens 9B, converted to convergent light by the collimator lens 23, converted from right-hand circularly polarized light to s-polarized light (that is, linearly polarized light) by the quarter wavelength plate 22, and enters the beam splitter 147.

The reflection coating 147A of the beam splitter 147 reflects the reflected light beam L12 composed of s-polarized light, and the reflected light beam L12 enters a beam splitter 148. As with the reflection coating 47B of the prism assembly 47 (FIG. 4), a reflection coating 148A of the beam splitter 148 transmits about 50% of light. About 50% of the reflected light beam L12 is reflected and becomes a reflected light beam L13, and the reflected light beam L13 enters a light beam splitting section 151.

The light beam splitting section 151 is generally plate-shaped. On a surface of the light beam splitting section 151 on which the reflected light beam L13 is incident, a plurality of diffraction gratings corresponding to the light beam splitting section 51 (FIG. 4) are formed (described below in detail). The diffraction gratings of the light beam splitting section 151 diffract the reflected light beam L13 and split the reflected light beam L13 into a plurality of reflected light beams L14. The reflected light beams L14 are incident on a photodetector 144.

As with the first embodiment, on a surface of the photodetector 144 on which the reflected light beams L14 is incident, the photodetection section 52 (FIG. 6) including a plurality of photodetection devices is formed.

The photodetector 144 generates the detection signal U in accordance with the intensity of light received by the photodetection devices of the photodetection section 52. The photodetector 144 amplifies the detection signal U using an amplifier circuit (not shown) and outputs the detection signal U to the signal processor 13 (FIG. 2).

About 50% of the reflected light beam L12 is reflected by the reflection coating 148A of the beam splitter 148 and becomes a reflected light beam L15. The reflected light beam L15, which is convergent light, becomes divergent light after being focused, and is incident on a photodetector 149.

On a surface of the photodetector 149 on which the reflected light beam L15 is incident, a photodetection section 154 is formed. The photodetection section 154, which corresponds to the photodetection section 54, includes a plurality of photodetection devices.

The photodetector 149 generates the detection signal U in accordance with the intensity of light received by the photodetection devices of the photodetection sections 154. The photodetector 149 amplifies the detection signal U using an amplifier circuit (not shown) and outputs the detection signal U to the signal processor 13 (FIG. 2).

That is, instead of the optical integrated device 21, the BD optical system 106B includes the laser diode 43, the beam splitters 147 and 148, the light beam splitting section 151, and the photodetectors 144 and 149.

Thus, in the optical pickup 106 of the BD optical system 106B, the light beam L11 is emitted by the laser diode 43, travels through various optical components, and is incident on the optical disc 100 in the BD-format.

In the BD optical system 106B, the reflected light beam L12, which is a portion of the light beam L11 reflected from the recording surface of the optical disc 100, travels through various optical components, and is received by the photodetectors 144 and 149. In accordance with the detection result, the detection signal U is generated.

2-2. Generation of Detection Signal in First Optical System

In the second embodiment, an optical system including the beam splitter 148, the light beam splitting section 151, and the photodetection section 52 is referred to as a first optical system 121A.

Figure 20A:
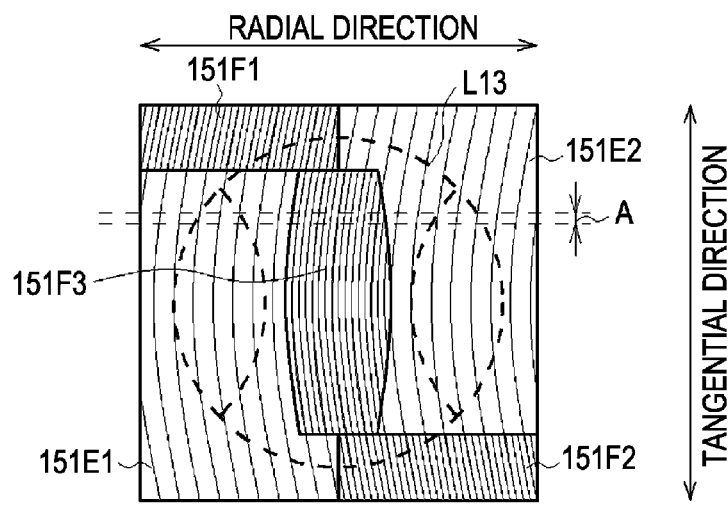
FIGS. 20A and 20B are diagrams of a light beam splitting section and a photodetection section according to the second embodiment.

As illustrated in FIG. 20A corresponding to FIG. 6A, the light beam splitting section 151 of the first optical system 121A includes a plurality of regions 151F1, 151F2, 151F3, 151E1, and 151E2.

The regions 151F1 and 151F2 are similar to the regions 51F1 and 51F2 of the light beam splitting section 51, respectively.

The region 151F3 has a barrel shape, instead of the rectangular shape of the region 53F (FIG. 6A). That is, the region 151F3 has linear boundary lines at the ends in the tangential direction and curved boundary lines at the sides in the radial direction. The curved boundary lines are curved outward in such a manner that the middle portions in the tangential direction are located farthest outward.

As with the regions 51E1 and 51E2 (FIG. 6A), the regions 151E1 and 151E2 are generally L-shaped. The boundary lines between the regions 151E1 and 151E2 and the region 151F3 are curved corresponding to the shape of the region 151F3.

Figure 20B:
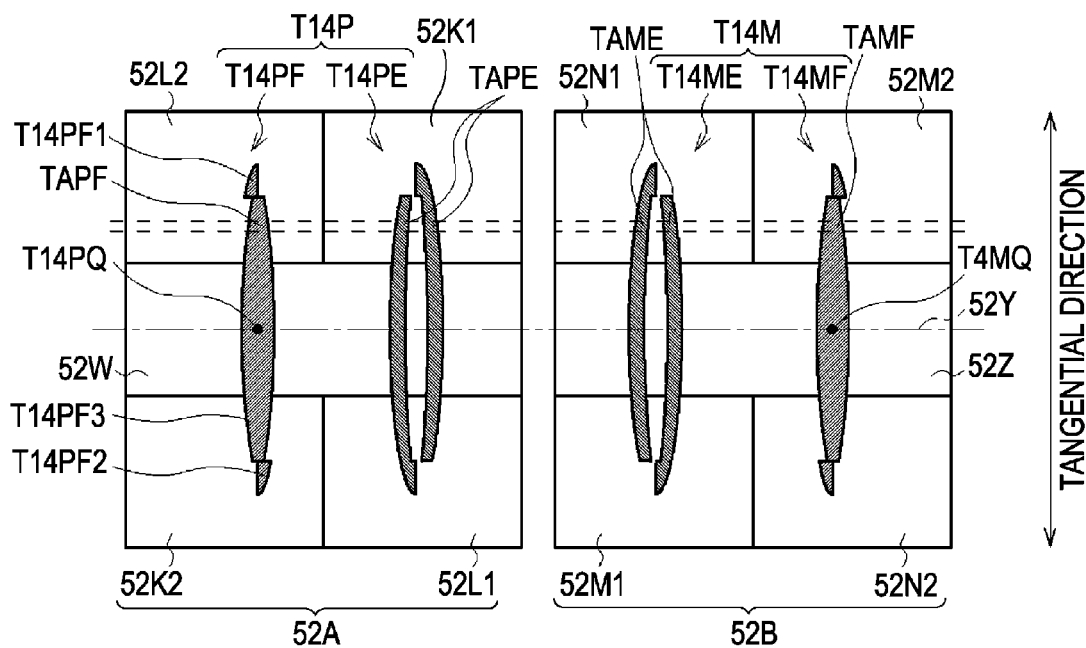

As illustrated in FIG. 20B corresponding to FIG. 6B, spots T14PF, T14PE, T14MF, and T14ME are formed on the photodetection section 52. The spots T14PF, T14PE, T14MF, and T14ME have shapes different from those of the spots T4PF, T4PE, T4MF, and T4ME, respectively.

Hereinafter, the spots T14PF and T14PE are collectively referred to as a spot T14P. The spots T14MF and T14ME are collectively referred to as a spot T14M. The spots T14PF, T14PE, T14MF, and T14ME are collectively referred to as a spot T14.

Each of the photodetection devices of the photodetection section 52 receives a portion of the spot T14, and generates a detection signal U in accordance with the amount of received light.

In the first embodiment, when calculating the lens shift signal SLS using equation (7), the signal processor 13 subtracts, for example, the detection signal UL2 from the detection signal UK1. Thus, the signal processor 13 can precisely calculate the lens shift signal SLS, irrespective of the difference in the area of the spot T4 due to a positional deviation in the tangential direction and the defocused state.

The lens shift signal SLS can be precisely calculated because the amounts of changes in the detection signals UK1 and UL2, which derive from the difference in the areas of the spots T4P and T4M due to a defocused state of the light beam L1 in the tangential direction, are equal.

Figure 21A:
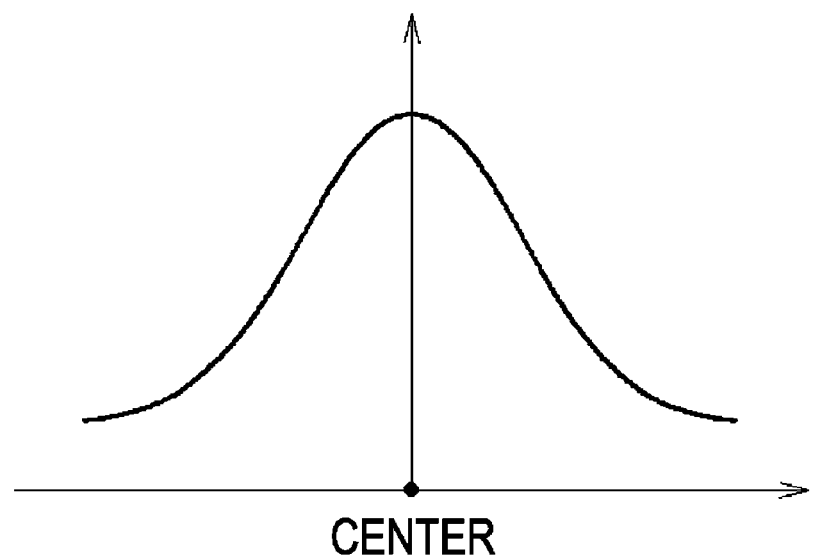
FIGS. 21A and 21B are graphs of the intensity of a light beam.

In practice, the intensity of the light beam L11, which depends on the characteristic of the laser diode 43, is not uniform. As illustrated in FIG. 21A, the intensity of the light beam L11 has a so-called Gaussian distribution with a peak at the center and gradually decreasing toward peripheries. The intensity of the reflected light beam L13 has a similar Gaussian distribution.

Figure 21B:
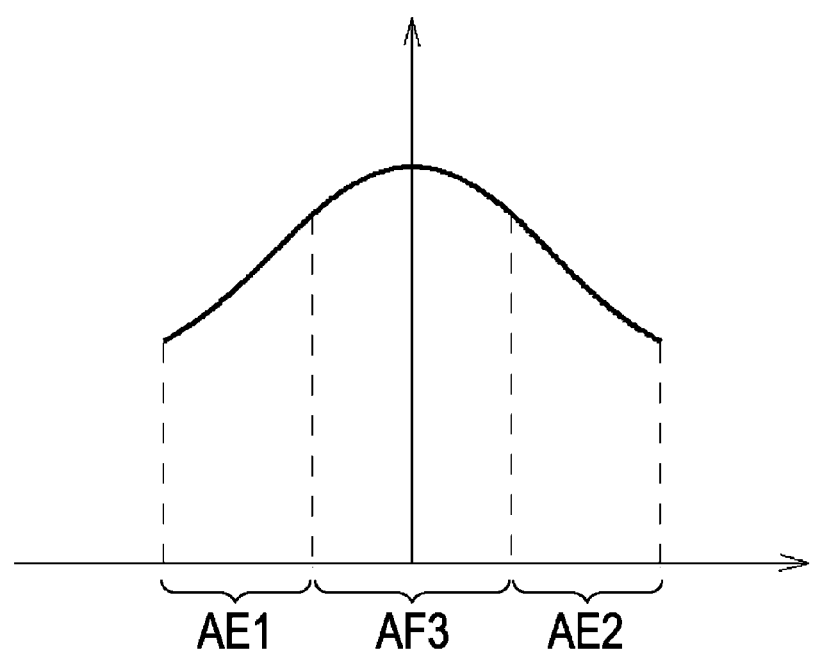

As illustrated in FIG. 20A, a specified segment A refers to a segment of the light beam splitting section 151 having a small width in the tangential direction. As illustrated in FIG. 21B corresponding to FIG. 21A, the distribution of the intensity of light on the specified segment A is a portion of Gaussian distribution.

In FIG. 21B, in the range in which the light beam L13 is formed, portions corresponding to the regions 151E1, 151F3, and 151E2 are referred to as segments AE1, AF3, and AE2, respectively.

In FIG. 20B, spot regions TAPE, TAPF, TAME, and TAMF of respective spots T14PE, T14PF, T14ME, and T14MF correspond to the specified segment A.

By appropriately setting the specified segment A, the spot regions TAPE and TAPF can be regarded, for example, as the changes in the areas of the spots T14PE and T14PF on the photodetection devices 52K1 and 52L2 due to the defocused state of the light beam L11.

That is, in order to make the amounts of changes in the detection signals UK1 and UL2 be equal, it is sufficient that the amounts of light on the spot regions TAPE and TAPF are equal when the specified segment A is arbitrarily set.

Thus, in the light beam splitting section 151, the boundary line between regions 151F3 and 151E1 and the boundary line between regions 151F3 and 151E2 are formed in such a manner that, for an arbitrary specified segment A, the integral of the intensity of light for the interval AF3 is equal to the integral of the intensity of light for the intervals AE1 and AE2.

As illustrated in FIG. 20A, the boundary lines are curved in such a manner that the middle portions in the tangential direction are located farthest outward, since the intensity of the reflected light beam L13 has a Gaussian distribution.

Thus, even if the spot T14 is formed at a position deviated in the tangential direction and the areas of the spots T14P and T14M are not equal, as in the case illustrated in FIG. 14, the photodetection devices 52K1 and 52L2 can make the amounts of changes in the detection signals UK1 and UL2 be approximately equal.

Likewise, at this time, the amounts of changes in the detection signals UL1 and UK2 are approximately equal, the amounts of changes in the detection signals UM1 and UN2 are approximately equal, and the amounts of changes in the detection signals UN1 and UM2 are approximately equal.

Therefore, by performing calculation using equation (7), (5), or (6), which are equivalent to each other, the signal processor 13 can generate, with high precision, the lens shift signal SLS in which the increments and the decrements in the detection signal U respectively cancel each other out with consideration of the Gaussian distribution.

2-3. Generation of Detection Signal in Second Optical System

The second embodiment does not include an optical component corresponding to the light beam splitting section 53 of the first embodiment. The reflected light beam L15 that has been transmitted by the beam splitter 148 is directly incident on the photodetection section 154. Hereinafter, an optical system including the beam splitter 148 and the photodetection section 154 is referred to as a second optical system 121B.

Figure 22:
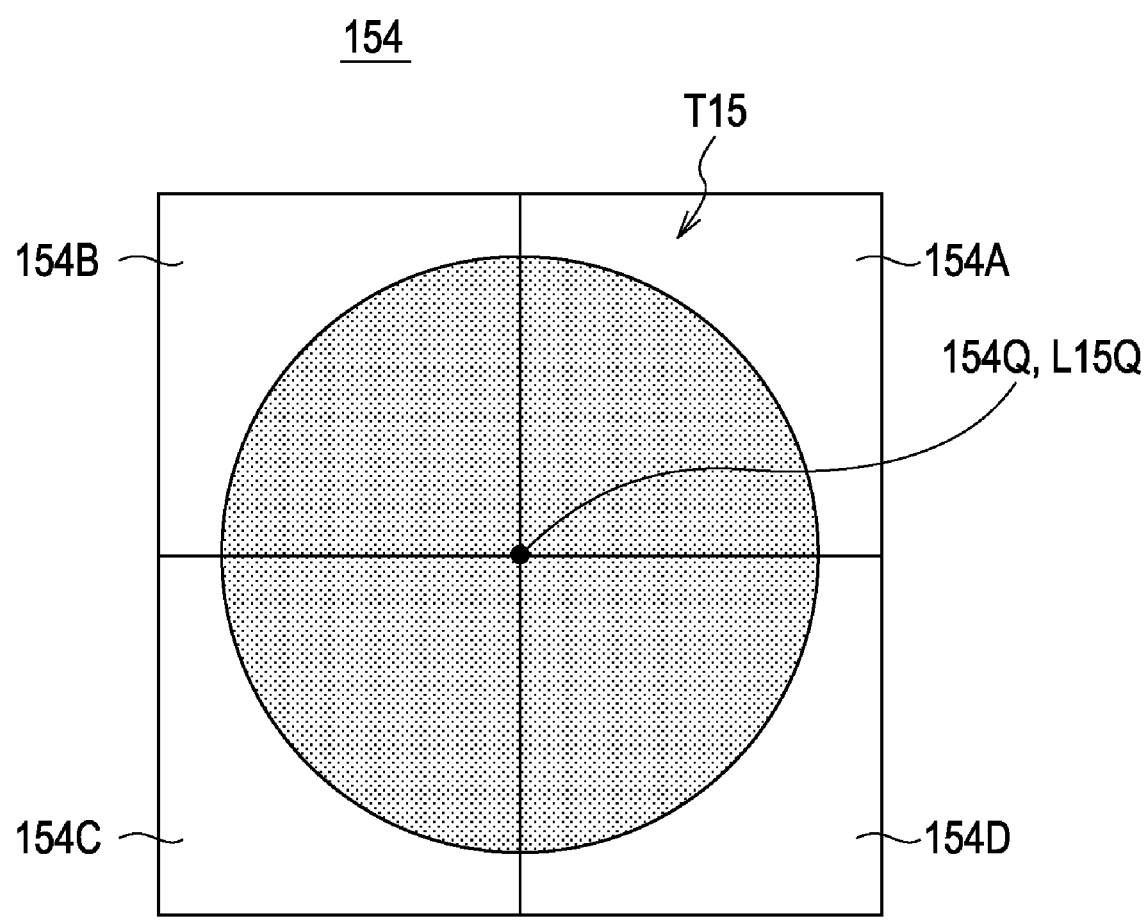
FIG. 22 is a diagram of the photodetection section according to the second embodiment.

As illustrated in FIG. 22, the photodetection section 154 of the second optical system 121B has a structure similar to that of the photodetection section 54. The photodetection section 154 is generally square-shaped and divided into four regions 154A, 154B, 154C, and 154D arranged in a grid pattern.

The second optical system 121B is designed in such a manner that an imaginary center L15Q of the reflected light beam L5 coincides with a division center 154Q of the photodetection section 154.

Since the optical components of the BD optical system 106B of the second embodiment are discrete, the mounting positions of the optical components can be adjusted comparatively freely. That is, with the BD optical system 106B, by adjusting the mounting position of the photodetector 149, the imaginary center L15Q of the reflected light beam L5 can be precisely made to coincide with the division center 154Q.

Thus, as with the photodetection devices 54A, 54B, 54C, and 54D in the first embodiment, the photodetection devices 154A, 154B, 154C, and 154D can generate the detection signals UA, UB, UC, and UD, respectively.

As a result, the signal processor 13 can calculate the tracking error signal STE using equation (8) and calculate the reproduction RF signal SRF using equation (9).

Thus, as with the first embodiment, the second optical system 121B can generate the detection signals UA to UD that enable the signal processor 13 to appropriately calculate the tracking error signal STE and the reproduction RF signal SRF.

2-4. Operation and Advantage

As described above, regarding the optical pickup 106 of the optical disc apparatus 101, in the first optical system 121A of an optical integrated device 121, the region 151F3 of the light beam splitting section 151 connects the regions 151F1 and 151F2 in the tangential direction.

The regions 151F and 151E of the light beam splitting section 151 diffract the reflected light beam L13 at diffraction angles so as to generate the reflected light beams L14PF, L14PE, L14MF, and L14ME that travel in different directions.

Subsequently, the reflected light beams L14PF, L14PE, L14MF, and L14ME respectively form the spots T14PF, T14PE, T14MF, and T14ME on the photodetection device groups 52A and 52B of the photodetection section 52. Each of the photodetection devices of the photodetection device groups 52A and 52B generates a detection signal U in accordance with the amount of received light, and outputs the detection signal U to the signal processor 13.

As with the first embodiment, using the detection signal U, the signal processor 13 generates the focus error signal SFE using equation (1), and generates the lens shift signal SLS using equations (3) to (5).

In particular, in the light beam splitting section 151, the boundary line between the region 151F3 and the region 151E1 and the boundary line between the region 151F3 and the region 151E2 are curved in such a manner that, in accordance with the Gaussian distribution of the intensity of the reflected light beam L13, for an arbitrary specified segment A, the integral of the intensity of light for the interval AF3 (FIG. 21B) is equal to the integral of the intensity of light for the intervals AE1 and AE2.

Thus, with the optical integrated device 121, even if the spot T14 is formed on the photodetection section 52 at a position deviated in the tangential direction and the light beam L11 is defocused, the amounts of changes in the detection signals UK1 and UL2 are approximately equal, as with the first embodiment.

Likewise, with the optical integrated device 121, the amounts of changes in the detection signals UL1 and UK2 are approximately equal, the amounts of changes in the detection signals UM1 and UN2 are approximately equal, and the amounts of changes in the detection signals UN1 and UM2 are approximately equal.

Therefore, by performing calculation using equation (7) on the basis of the detection signal U supplied from the optical integrated device 121, the signal processor 13 can generate, with high precision, the lens shift signal SLS from which the effect of deviation of the mounting positions of the optical components and the effect of the defocused state of the light beam L11 are eliminated with consideration of the Gaussian distribution.

The optical integrated device 121 has other advantages similar to those of the optical integrated device 21 of the first embodiment.

As described above, in the first optical system 121A of the optical integrated device 121, the light beam splitting section 151 includes the regions 151F1, 151F2, and 151F3. The regions 151F1 and 151F2 are disposed at ends of the light beam splitting section 151 in the tangential direction and on opposite sides of the light beam splitting section 151 in the radial direction, and the region 151F3 connects the regions 151F1 and 151F2 in the tangential direction. Thus, in the first optical system 121A, even if the spot T14 is formed at a position deviated in the tangential direction and the areas of the spots T14P and T14M are not equal, the amounts of changes in the detection signals UK1 and UL2, the amounts of changes in the detection signals UL1 and UK2, the amounts of changes in the detection signals UM1 and UN2, and the amounts of changes in the detection signals UN1 and UM2 are approximately equal, respectively. Therefore, by performing calculation using equation (7), the signal processor 13 can calculate, with high precision, the lens shift signal SLS from which the effect of deviation of the mounting positions of the optical components and the effect of the defocused state of the light beam L11 are eliminated.

3. Other Embodiments

In the first embodiment, the sum of the areas in the regions 51E1 and 51E2 on which the reflected light beam L3 is incident is approximately equal to the area of the region 51F3.

In the second embodiment, the region 151F3 is formed in such a manner that, for an arbitrary specified segment A (FIG. 20A), the integral of the intensity of light for the interval AF3 is equal to the integral of the intensity of light for the intervals AE1 and AE2.

The present invention is not limited thereto. What matters is that, when the spot T4 is formed at a position deviated in the tangential direction and the areas of the spots T4P and T4M are not equal, the amounts of changes in, for example, the detection signals UK1 and UL2 substantially cancel each other out using equation (7).

That is, in the present invention, the region 51F3 or 151F3 may have any shape as long as the region 51F3 connects the regions 51F1 and 51F2 or the region 151F3 connects the regions 151F1 and 151F2. In this case, although the amounts of changes in the detection signals UK1 and UL2 may not substantially cancel each other out as with the first and second embodiments, the effect of deviation of the position of the spot T4 can be corrected to a certain degree.

When the distribution width of the intensity of the reflected light beam L13 is comparatively small, even if the region 51F3 is substantially rectangular as in the first embodiment, the effect due to the deviation of the position of the spot T4 can be appropriately corrected.

Figure 23A:
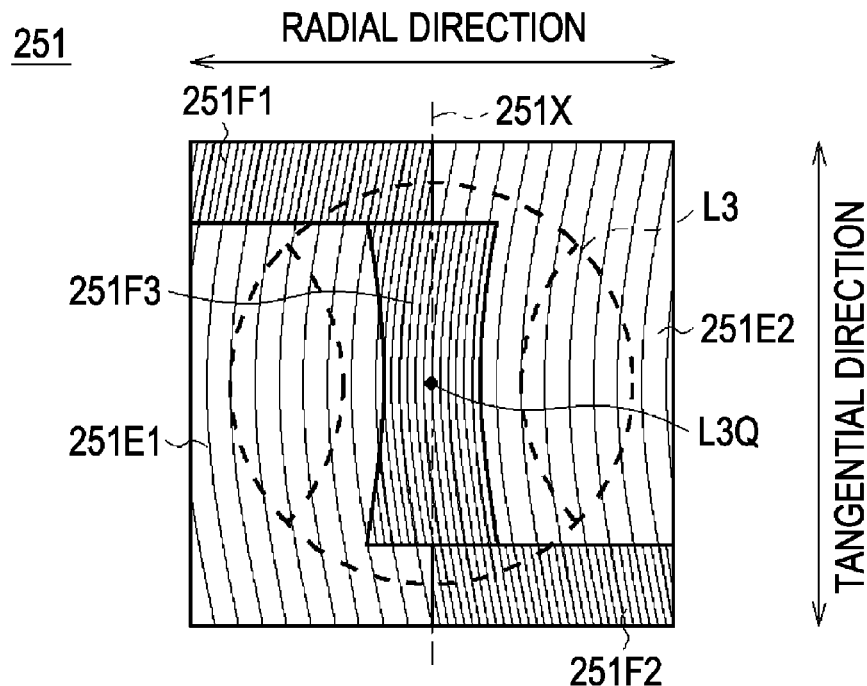
FIGS. 23A and 23B are diagrams of a light beam splitting section according to another embodiment.

In the first embodiment, the region 51F3 is substantially rectangular. In the second embodiment, the region 151F3 is substantially barrel-shaped. The present invention is not limited thereto. For example, as illustrated in FIGS. 23A and 23B, in a light beam splitting section 251 corresponding to the light beam splitting section 51, the region 251F3 may be substantially catenoid-shaped.

In the case of the light beam splitting section 251, so as to correspond to the shapes of the push-pull regions PP1 and PP2 of the reflected light beam L3 (FIG. 5), the boundary line between the regions 251F3 and 251E1 and the boundary line between the regions 251F3 and 251E2 are curved in such a manner that the middle portions of the curves are close to the center L3Q.

Figure 23B:
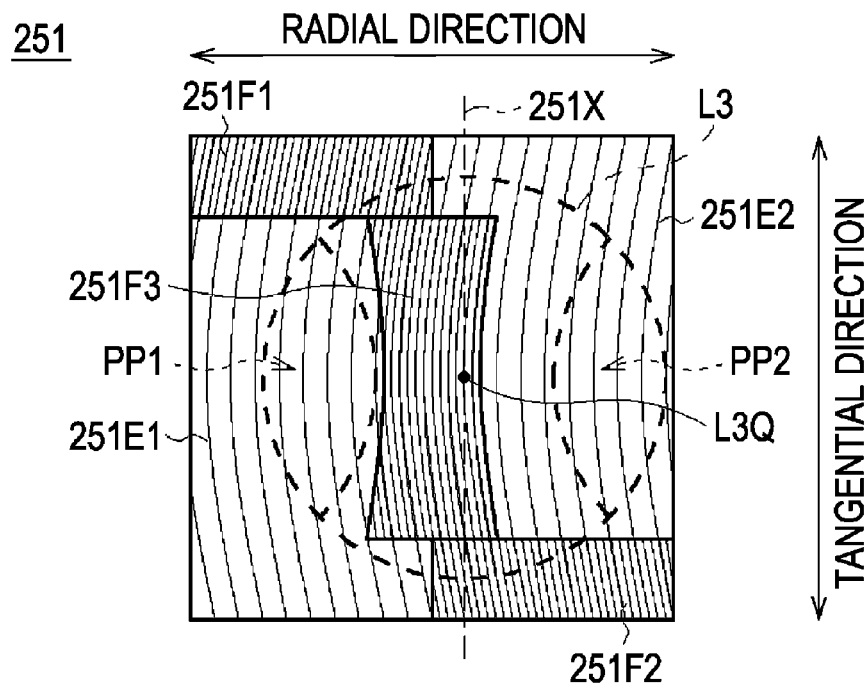

Therefore, as illustrated in FIG. 23B, in the light beam splitting section 251, even if the reflected light beam L3 moves in the radial direction due to lens shift or the like, portions of the reflected beam L3 corresponding to the push-pull regions PP1 and PP2 are not incident on the region 251F3. Thus, the photodetection devices 52K2 and 52L2 of the photodetection section 52 (FIG. 6B) can stably generate the detection signals UK2 and UL2, etc., without being affected by variation in the push-pull components.

Figure 24:
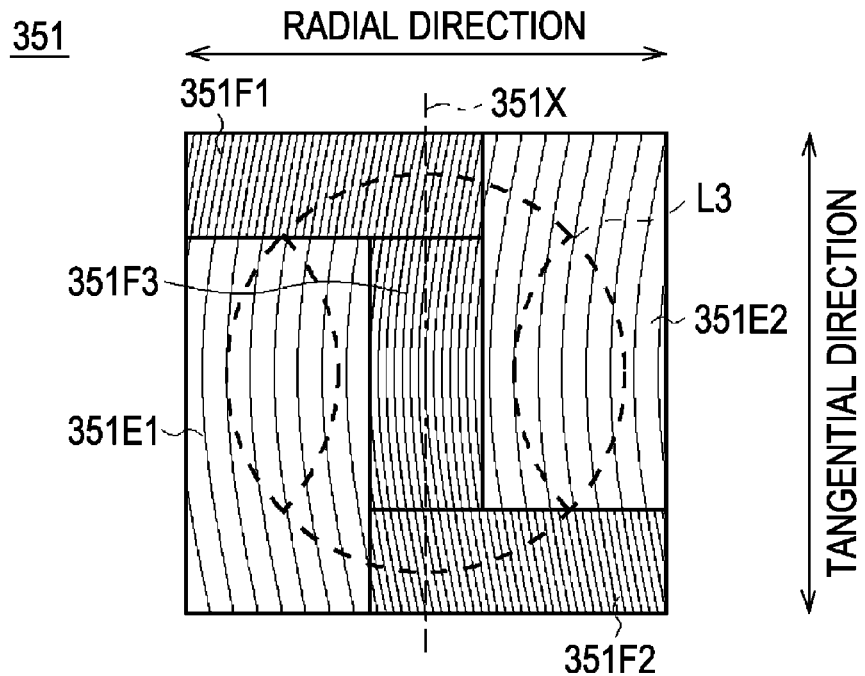
FIG. 24 is a diagram of a light beam splitting section according to another embodiment.

In the first embodiment, the length of each of the regions 51F1 and 51F2 (FIG. 6A) of the light beam splitting section 51 in the radial direction is about a half the length of the light beam splitting section 51. The present invention is not limited thereto. For example, as illustrated in FIG. 24, a light beam splitting section 351 may include regions 351F1 and 351F2 respectively corresponding to the regions 51F1 and 51F2 of the light beam splitting section 51.

The regions 351F1 and 351F2 have lengths in the radial direction larger than those of the regions 51F1 and 51F2. Each of the regions 351F1 and 351F2 extends across an imaginary center line 351X of the light beam splitting section 351.

Therefore, as compared with the light beam splitting section 51, the difference between the detection signals UL2 and LK2, which are generated by the photodetection devices 52K2 and 52L2 of the photodetection section 52 (FIG. 6B), and the detection signals UK1 and UL1, which are generated by the photodetection devices 52K1 and 52L1 of the photodetection section 52, can be increased. As a result, the amplitude of the lens shift signal SLS calculated by the signal processor 13 using equation (7) can be increased. The same applies to the second embodiment.

Figure 25:
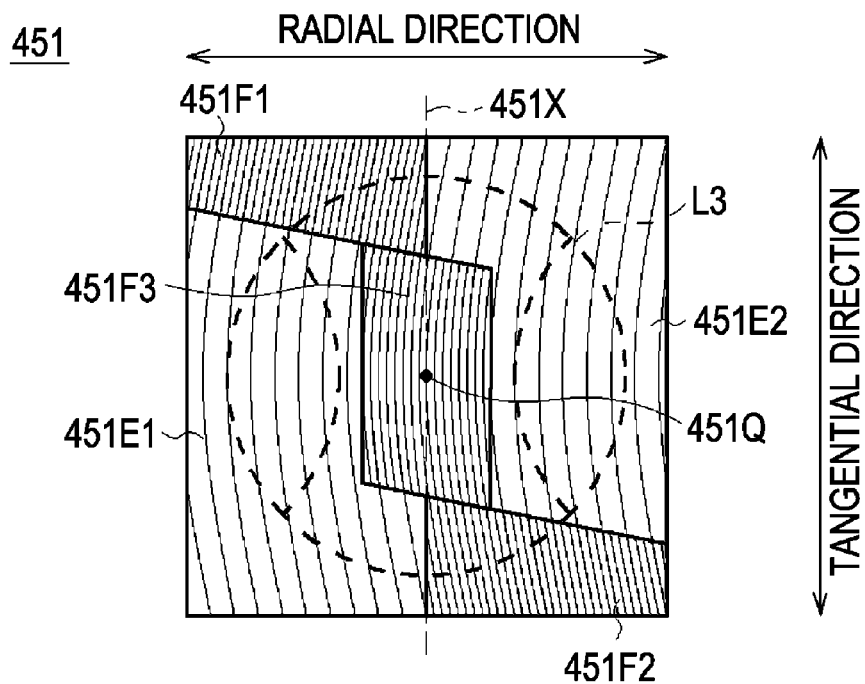
FIG. 25 is a diagram of a light beam splitting section according to another embodiment.

In the first embodiment, the regions 51F1 and 51F2 (FIG. 6A) of the light beam splitting section 51 are substantially rectangular. The present invention is not limited thereto. For example, as illustrated in FIG. 25, a light beam splitting section 451 may include regions 451F1 and 451F2 that are not rectangular.

In contrast to the case of the region 51F1, the boundary line between the regions 451F1 and 451E1 is not substantially parallel to the radial direction. The boundary line is inclined with respect to the radial direction in such a manner that a line 451X side of the boundary line is close to the center 451Q. The region 451F2 is rotationally symmetrical to the region 451F1 around the center 451Q, and the boundary line between the regions 451F2 and 451E2 is inclined in a similar manner. Also in this case, the signal processor 13 can appropriately calculate the lens shift signal SLS using equation (7), etc.

The same applies to the second embodiment.

Figure 26:
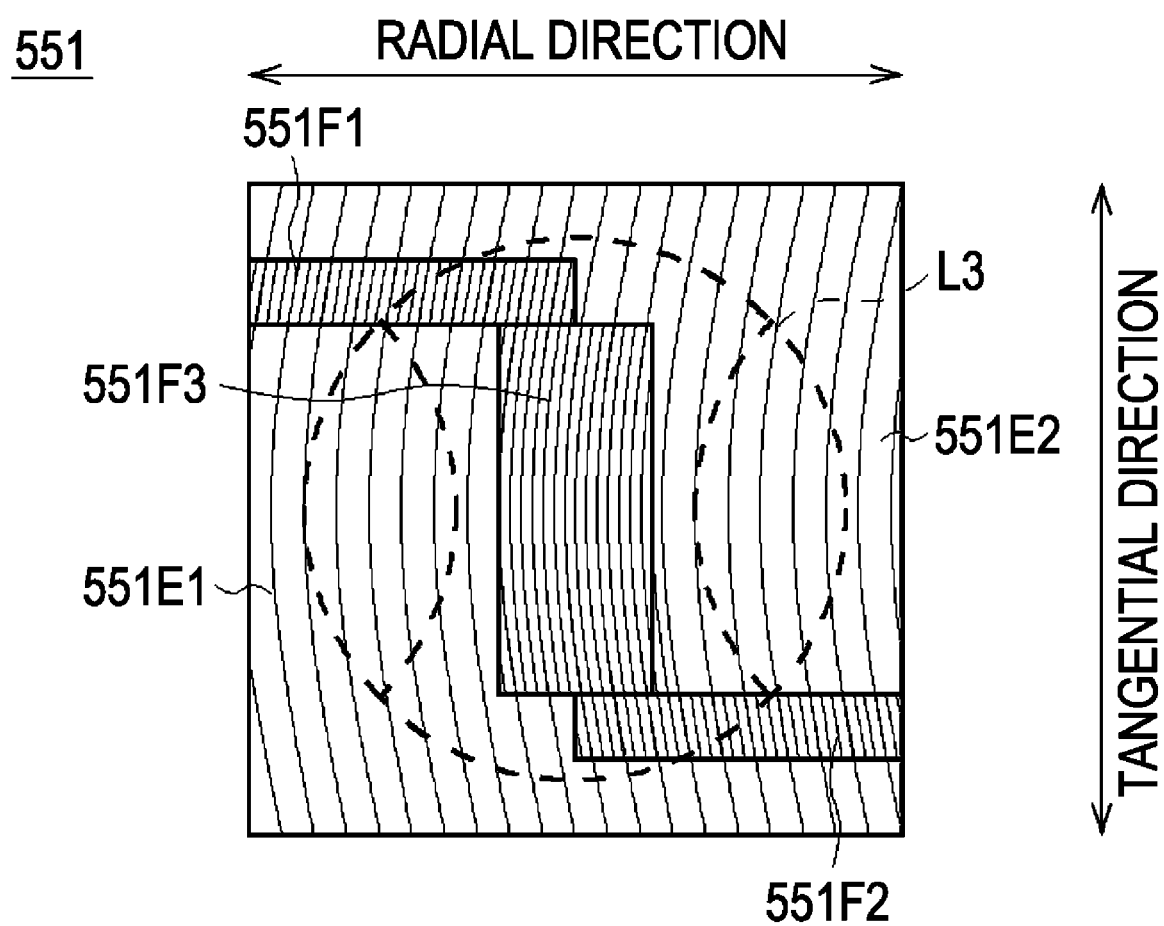
FIG. 26 is a diagram of a light beam splitting section according to another embodiment.

In the first embodiment, the regions 51F1 and 51F2 (FIG. 6A) are disposed at ends of the light beam splitting section 51 in the tangential direction. The present invention is not limited thereto. For example, as illustrated in FIG. 26, regions 551F1 and 551F2 may be disposed at positions slightly closer to the center than to the ends of a light beam splitting section 551 in the tangential direction. Also in this case, the signal processor 13 can appropriately calculate the lens shift signal SLS using equation (7). The same applies to the second embodiment.

In the first embodiment, the diffraction gratings formed on the regions of the light beam splitting section 51 split the reflected light beam L3 into the reflected light beams L4. The present invention is not limited thereto. The reflected light beam L3 may be split into the reflected light beams L4 using other optical elements, such as holograms, on the regions of the light beam splitting section 51. The same applies to the second embodiment.

In the first embodiment, the diffraction gratings formed on the regions of the light beam splitting section 51 function in a similar manner to cylindrical lenses so as to focus the spot T4 in the radial direction. The present invention is not limited thereto. The diffraction grating formed on the regions may not function in a similar manner as cylindrical lenses. In this case, cylindrical lenses may be provided independently, or, the photodetection section 52 may be extended in the tangential direction. The same applies to the second embodiment.

In the first embodiment, the photodetection device group 52A (FIG. 6B), for example, of the photodetection section 52 is roughly divided into three portions in the tangential direction. Moreover, the portions at ends in the radial direction are divided into two subportions. The present invention is not limited thereto. For example, the photodetection device group may be divided into four or more portions in the tangential direction. In this case, it is sufficient that the photodetection device group be divided into two or more portions in the tangential direction and the portion at the ends be divided into two subportions in the radial direction. In practice, in order to calculate the lens shift signal SLS, it is sufficient that the photodetection device groups 52A and 52B of the photodetection section 52 independently detect the amount of light on the spots T4PF1, T4PF2, T4PE3, and T4PE4.

As long as the regions of the photodetection device groups 52A and 52B on which the spots T4PE and T4PF are formed are divided into three or more portions in the tangential direction, the focus error signal SFE can be calculated by the spot size detecting (SSD) method on the basis of the detection signal U. The same applies to the second embodiment.

In the first embodiment, in the photodetector 44, the photodetection devices of the photodetection sections 52 and 54 generate the detection signal U, and the detection signal U is amplified by the predetermined amplifier circuit and supplied to the signal processor 13. The present invention is not limited thereto. For example, the photodetector 44 may perform addition operations corresponding to equations (2) so as to generate the intermediate values UK, UL, UM, and UN, amplify the intermediate values UK, UL, UM, and UN, and supply the intermediate values to the signal processor 13.

In this case, in the photodetector 44, the number of the amplifier circuits for amplifying the detection signals can be reduced so that reduction in the precision of the detection signals due to so-called amplifier noise can be suppressed. The same applies to other embodiments.

In the first embodiment, the BD optical system 6B includes the optical integrated device 21 including the light beam splitting section 51. In the second embodiment, the BD optical system 106B includes the light beam splitting section 151 that is a discrete component. The present invention is not limited thereto. The optical system or the optical pickup may include the light beam splitting section 51 that is a discrete component or that is a component combined with other components.

In the first embodiment, the tracking error signal STE and the production RF signal SRF are generated by the push-pull method on the basis of the detection signals UA to UD generated by the second optical system 21B. The present invention is not limited thereto. The tracking error signal STE may be generated by other methods or may be generated on the basis of the detection signal U generated by either of the first optical system 21A and the second optical system 21B. What matters is that at least one of the focus error signal SFE and the lens shift signal SLS is generated on the basis of detection signal U generated by the first optical system 21A. The same applies to the second embodiment.

In the first embodiment, in the BD optical system 6B corresponding to the optical disc 100B in BD-format, the light beam splitting section 51 includes the region 51F3. The present invention is not limited thereto. The present invention is applicable to an optical pickup and the like corresponding to optical disks in various formats. For example, the DVD/CD optical system 6D may include a light beam splitting section similar to the light beam splitting section 51. An optical pickup corresponding to the optical disc 100D in DVD format or an optical pickup corresponding to the optical disc 100C in CD format may include a light beam splitting section similar to the light beam splitting section 51. The optical pickup 6 may include only the BD optical system 6B. The same applies to the second embodiment.

In the first embodiment, the optical disc apparatus 1 can record information on the optical disc 100 and reproduce information from the optical disc 100. The present invention is not limited thereto. For example, the present invention may be applied to a so-called reproduction-only optical disc apparatus that can only reproduce information from the optical disc 100.

In the above-described embodiments, the optical integrated device 21 includes the laser diode 43 serving as a light source, the light beam splitting section 51 serving as a light splitting-and-guiding section, and the photodetection section 52 serving as a light receiving section. The present invention is not limited thereto. An optical integrated device according to an embodiment of the present invention may include a light source, a light splitting-and-guiding section, and a light receiving section that are different from the laser diode 43, the light beam splitting section 51, and the photodetection section 52, respectively.

In the above-described embodiments, the optical pickup 6 includes the laser diode 43 serving as a light source, the objective lens 9B, the light beam splitting section 51 serving as a light splitting-and-guiding section, and the photodetection section 52 serving as a light receiving section. However, the present invention is not limited thereto. An optical pickup according to an embodiment of the present invention may include a light source, an objective lens, a light splitting-and-guiding section, and a light receiving section that are different from the laser diode 43, the objective lens 9B, the light beam splitting section 51, and the photodetection section 52, respectively.

In the above-described embodiments, the optical disc apparatus 1 includes the laser diode 43 serving as a light source, the objective lens 9B, the light beam splitting section 51 serving as a light splitting-and-guiding section, the photodetection section 52 serving as a light receiving section, the signal processor 13, and the drive controller 12 and the actuator 8 serving as a driving section. However, the present invention is not limited thereto. An optical disc apparatus according to an embodiment of the present invention may include a light source, an objective lens, a light splitting-and-guiding section, a light receiving section, a signal processor, and a driving section that are different from the laser diode 43, the objective lens 9B, the light beam splitting section 51, the photodetection section 52, the signal processor 13, and the drive controller 12 and the actuator 8, respectively.

The present application contains subject matter related to that disclosed in Japanese Priority Patent Application JP 2008-319902 filed in the Japan Patent Office on Dec. 16, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical integrated device comprising:
   a light source to emit a light beam;
   a light splitting-and-guiding section to split a reflected light beam into two end light beams, a connection light beam, and a residual light beam, and to guide the two end light beams and the connection light beam in directions different from a direction of the residual light beam, the reflected light beam being a portion of the light beam reflected from an optical disc including a track extending in a tangential direction, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and
   a light receiving section to receive the two end light beams and the connection light beam with a plurality of photodetection devices divided, in the tangential direction, into at least two regions within a range in which the connection light beam is incident, to receive the residual light beam with a plurality of photodetection devices divided, in the tangential direction, into a plurality of regions having widths at least corresponding to portions on which the two end light beams are incident, and to output a detection signal in accordance with an amount of light received with each of the photodetection devices.

2. The optical integrated device according to claim 1, wherein the light splitting-and-guiding section splits the reflected light beam in such a manner that an intensity of the connection light beam is approximately equal to an intensity of the residual light beam in a connection range corresponding to the connection region in the tangential direction.

3. The optical integrated device according to claim 2, wherein the light source emits the light beam at an intensity having a Gaussian distribution, and the light splitting-and-guiding section splits the reflected light beam in such a manner that the intensity of the connection light beam is approximately equal to the intensity of the residual light beam in an arbitrary segment of the connection range with respect to the tangential direction.

4. The optical integrated device according to claim 1, wherein the light splitting-and-guiding section splits the reflected light beam in such a manner that an area of the connection region of the cross section of the reflected light beam is approximately equal to an area of the residual region of the cross section of the reflected light beam in a connection range corresponding to the connection region in the tangential direction.

5. The optical integrated device according to claim 1, wherein the light splitting-and-guiding section splits the reflected light beam in such a manner that a superposed region does not overlap the connection region, the superposed region being a region on which reflected diffracted light is superposed on the reflected light beam, the reflected diffracted light being generated due to the track when the light beam is reflected.

6. The optical integrated device according to claim 1, wherein the light splitting-and-guiding section diffracts the reflected light beam in the end regions, in the connection region, and in the residual region, so as to split each of the two end light beams, the connection light beam, and the residual light beam into positive diffracted light and negative diffracted light, one of the positive and negative diffracted light having a large angle of divergence and the other of the positive and negative diffracted light having a small angle of divergence, and
wherein the light receiving section includes a positive photodetection device group to receive the two end light beams, the connection light beam, and the residual light beam composed of the positive diffracted light, and a negative photodetection device group to receive the two end light beams, the connection light beam, and the residual light beam composed of the negative diffracted light.

7. A method for detecting light comprising:
emitting a light beam from a predetermined light source;
splitting a reflected light beam into two end light beams, a connection light beam, and a residual light beam, and guiding the two end light beams and the connection light beam in directions different from a direction of the residual light beam, the reflected light beam being a portion of the light beam reflected from an optical disc including a track extending in a tangential direction, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and receiving the two end light beams and the connection light beam with a plurality of photodetection devices divided, in the tangential direction, into at least two regions within a range in which the connection light beam is incident, receiving the residual light beam with a plurality of photodetection devices divided, in the tangential direction, into a plurality of regions having widths at least corresponding to portions on which the two end light beams are incident, and outputting a detection signal in accordance with an amount of light received with each of the photodetection devices.

8. An optical pickup comprising:

a light source to emit a light beam;

an objective lens to focus the light beam on an optical disc including a track extending in a tangential direction;

a light splitting-and-guiding section to split a reflected light beam into two end light beams, a connection light beam, and a residual light beam, and to guide the two end light beams and the connection light beam in directions different from a direction of the residual light beam, the reflected light beam being a portion of the light beam reflected from the optical disc, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region; and a light receiving section to receive the two end light beams and the connection light beam with a plurality of photodetection devices divided, in the tangential direction, into at least two regions within a range in which the connection light beam is incident, to receive the residual light beam with a plurality of photodetection devices divided, in the tangential direction, into a plurality of regions having widths at least corresponding to portions on which the two end light beams are incident, and to output a detection signal in accordance with an amount of light received with each of the photodetection devices.

9. An optical disc apparatus comprising:

a light source to emit a light beam;

an objective lens to focus the light beam on an optical disc including a track extending in a tangential direction;

a light splitting-and-guiding section to split a reflected light beam into two end light beams, a connection light beam, and a residual light beam, and guides the two end light beams and the connection light beam in directions different from a direction of the residual light beam, the reflected light beam being a portion of the light beam reflected from the optical disc, the two end light beams passing through two end regions of a cross section of the reflected light beam, the two end regions being positioned at ends of the cross section in the tangential direction and on opposite sides of the cross section in a radial direction of the optical disc, the connection light beam passing through a connection region of the cross section, the connection region connecting the end regions to each other, the residual light beam passing through a residual region of the cross section, the residual region being a region excluding the two end regions and the connection region;

a light receiving section to receive the two end light beams and the connection light beam with a plurality of photodetection devices divided, in the tangential direction, into at least two regions within a range in which the connection light beam is incident, to receive the residual light beam with a plurality of photodetection devices divided, in the tangential direction, into a plurality of regions having widths at least corresponding to portions on which the two end light beams are incident, and to output a detection signal in accordance with an amount of light received with each of the photodetection devices;

a signal processor to generate, on the basis of the detection signal, an error signal that represents an amount of deviation of a focus of the light beam from a target position at which the light beam is to be focused; and a driving section to control driving of the objective lens on the basis of the error signal.

* * * * *